(12) United States Patent
Kobayashi

(10) Patent No.: US 9,177,258 B2
(45) Date of Patent: Nov. 3, 2015

(54) IMPLEMENTING A LEARNING ALGORITHM AND ESTIMATION FUNCTION UTILIZING A RANDOMLY SELECTED PROTOTYPE FUNCTION WITH RANDOMLY SET PARAMETERS

(75) Inventor: Yoshiyuki Kobayashi, Tokyo (JM)

(73) Assignee: SONY CORPORATION, Tokyo (JP)

( * ) Notice: Subject to any disclaimer, the term of this patent is extended or adjusted under 35 U.S.C. 154(b) by 384 days.

(21) Appl. No.: 13/176,579

(22) Filed: Jul. 5, 2011

(65) Prior Publication Data

US 2012/0016822 A1     Jan. 19, 2012

(30) Foreign Application Priority Data

Jul. 14, 2010   (JP) ................ P2010-159597

(51) Int. Cl.
  *G06N 99/00*  (2010.01)
  *G06K 9/62*  (2006.01)
(52) U.S. Cl.
  CPC ............ *G06N 99/005* (2013.01); *G06K 9/6256* (2013.01)
(58) Field of Classification Search
  CPC .......................... G06N 99/005; G06K 9/6256
  USPC ........................................................ 706/12
  See application file for complete search history.

(56) References Cited

U.S. PATENT DOCUMENTS

2009/0048991 A1*   2/2009   Kobayashi ............... 706/13

FOREIGN PATENT DOCUMENTS

JP    2007-122186    5/2007
JP    2010-159597    7/2010

OTHER PUBLICATIONS

Tinós et al., Selection of Radial Basis Functions via Genetic Algorithms in Pattern Recognition Problems, 10th Brazilian Symposium on Neural Networks, 2008.*
Hofmann et al., Feature Selection for Intrusion Detection: An Evolutionary Wrapper Approach, University of Passau, Germany, 2004.*
Webb et al., Adaptive Radial Basis Functions, Proceedings of ICPR '96, 1996.*
Kuang et al., An Implementation of a Radial Basis Function Network States Observer, International Conference on Intelligent and Advanced Systems, 2007.*
Schaffer et al., Combinations of Genetic Algorithms and Neural Networks: A Survey of the State of the Art, 1992.*

(Continued)

*Primary Examiner* — Jeffrey A Gaffin
*Assistant Examiner* — Robert H Bejcek, II
(74) *Attorney, Agent, or Firm* — Hazuki International, LLC

(57) ABSTRACT

There is provided an information processing method including inputting a feature quantity vector and an objective variable corresponding to the feature quantity vector, generating a basis function for outputting a scalar quantity by mapping the feature quantity vector, mapping the feature quantity vector using the basis function and calculating the scalar quantity corresponding to the feature quantity vector, evaluating whether or not the basis function used to calculate the scalar quantity is useful for estimating the objective variable using the objective variable along with the scalar quantity and the feature quantity vector corresponding to the scalar quantity, generating an estimation function for estimating the objective variable from the scalar quantity by machine learning on the basis of the scalar quantity and the objective variable corresponding to the scalar quantity using the basis function evaluated to be useful, and outputting the estimation function.

7 Claims, 19 Drawing Sheets

(56) References Cited

OTHER PUBLICATIONS

Li et al., Genetic Algorithm Based Feature Selection for Mass Spectrometry Data, 2008.*

Lanzi, Fast Feature Selection with Genetic Algorithms: A Filter Approach, Dipartimento di Elettronica e Informazione Politecnico de Milano, Italia, 1997.*

Carse et al., Evolving Radial Basis Function Neural Networks using a Genetic Algorithm, University of the West of England, Bristol, 1995.*

Schölkopf et al., Comparing Support Vector Machines with Gaussian Kernels to Radial Basis Function Classifiers, IEEE Transactions on Signal Processing, vol. 45, No. 11, Nov. 1997.*

Angeline, Evolving Basis Functions with Dynamic Receptive Fields, 1997.*

Lacerda, Evolutionary Radial Basis Functions for Credit Assessment, Applied Intelligence 22, p. 167-181, 2005.*

Jones, Genetic and Evolutionary Algorithms, Paul von Rague Schleyer and Johnny Gasteiger, editors, Encyclopedia of Computational Chemistry, vol. III—Databases and Expert Systems, chapter 29, Sep. 1998.*

\* cited by examiner

FIG.2

FEATURE QUANTITY VECTOR x⁽¹⁾

(LEARNING DATA)

| | X₁ | X₂ | ... | X_D | OBJECTIVE VARIABLE t |
|---|---|---|---|---|---|
| Data 1 | 0.599790 | 0.782337 | ... | 0.755540 | 0 |
| Data 2 | 0.804202 | 0.351444 | ... | 0.775383 | 0 |
| Data 3 | 0.236861 | 0.208481 | ... | 0.094466 | 0 |
| Data 4 | 0.800456 | 0.067480 | ... | 0.544872 | 1 |
| Data 5 | 0.390324 | 0.363619 | ... | 0.164502 | 0 |
| ⋮ | ⋮ | ⋮ | ... | ⋮ | ⋮ |
| Data N | 0.650606 | 0.655042 | ... | 0.462693 | 0 |

OBJECTIVE VARIABLE t⁽ᴺ⁾

FIG.3

(BASIS FUNCTION CALCULATION RESULT)

| | $\Phi_1(x)$ | $\Phi_2(x)$ | $\Phi_3(x)$ | $\cdots$ | $\Phi_M(x)$ |
|---|---|---|---|---|---|
| Data 1 | 0.178873 | 0.782337 | 0.650606 | $\cdots$ | 0.105648 |
| Data 2 | 0.004723 | 0.072954 | 0.178873 | $\cdots$ | 0.721549 |
| Data 3 | 0.804202 | 0.208481 | 0.351444 | $\cdots$ | 0.390324 |
| Data 4 | 0.212113 | 0.713429 | 0.132219 | $\cdots$ | 0.110125 |
| Data 5 | 0.655042 | 0.363619 | 0.236861 | $\cdots$ | 0.613971 |
| $\vdots$ | $\vdots$ | $\vdots$ | $\vdots$ | $\cdots$ | $\vdots$ |
| Data N | 0.067480 | 0.011464 | 0.800456 | $\cdots$ | 0.599790 |

$\Phi_3(x^{(N)})$

IMPLEMENTING A LEARNING ALGORITHM AND ESTIMATION FUNCTION UTILIZING A RANDOMLY SELECTED PROTOTYPE FUNCTION WITH RANDOMLY SET PARAMETERS

BACKGROUND

The present disclosure relates to an information processing device, an information processing method, and a program.

In the related art, algorithms such as linear regression/discrimination, SVM/SVR, and RVM are known as learning algorithms for performing regression or discrimination. SVM stands for "support vector machine," SVR for "support vector regression," and RVM for "relevance vector machine." Japanese Patent Application Laid-Open No. 2007-122186 discloses a method of automatically generating a feature quantity detection algorithm for detecting a feature quantity from content data using a learning algorithm such as linear regression, non-linear regression, or SVM.

1: Beginning

Before the embodiments of the present disclosure are described, linear regression/discrimination, SVM/SVR, and RVM will be briefly described and problems of the techniques of the related art will be described. These learning algorithms are algorithms of receiving a feature quantity vector x and generating an estimation function $f(x)=\Sigma w_m \phi_m(x)+w_0$ in which basis functions $\phi_m(x)$ (m=1 to M) for outputting a scalar quantity are linearly combined, by machine learning. Specifically, when a feature quantity vector $x_j$ (j=1 to N) and an objective variable $t_j$ are given as learning data, an estimation function f(x) for estimating an estimation value y of an objective variable t from a feature quantity vector x is obtained by machine learning.

[1-1: Linear Regression/Discrimination]

The linear regression/discrimination is a learning algorithm for generating an estimation function f(x) expressed by the following Equation (1) by machine learning. In this regard, a weight vector w is a vector quantity $w=(w_1, \ldots, w_M)$ having the same number of dimensions as a feature quantity vector x. That is, the linear regression/discrimination corresponds to the case where the basis function $\phi_m$ is $\phi_m(x)=x_m$ (hereinafter, a linear model).

$$f(x)=w^T x+w_0 \quad (1)$$

A calculation amount necessary to calculate the estimation function f(x) is only M product-sum operations to be executed when $w^T x$ is calculated and an addition of $w_0$. Accordingly, a calculation load necessary to calculate the estimation function f(x) is low. However, if there is non-linearity between a feature quantity vector $x_j$ and an objective variable $t_j$, it is difficult to obtain the estimation function f(x) capable of accurately fitting a set of the feature quantity vector $x_j$ and the objective variable $t_j$ using the linear model.

[1-2: SVM/SVR and RVM]

On the other hand, SVM/SVR and RVM use a model in which a non-linear kernel function $k(x, x^{(m)})$ is applied to the basis function $\phi_m$ (hereinafter, a non-linear model). That is, SVM/SVR and RVM are learning algorithms for generating the estimation function f(x) expressed by the following Equation (2) by machine learning. For example, a Gaussian kernel expressed by the following Equation (3) can be used as the non-linear kernel function $k(x, x^{(m)})$. In this regard, a vector $x^{(m)}$ is a parameter having the same number of dimensions as a feature quantity vector x.

$$f(x)=\sum_m w_m k(x, x^{(m)})+w_0 \quad (2)$$

$$k(x, x^{(m)})=\exp\left(\frac{-|x-x^{(m)}|^2}{2\sigma^2}\right) \quad (3)$$

If the number of elements of a weight vector w obtained by SVM is large, most of them converge to 0. For example, the number of dimensions of the remaining elements not converging to 0 in the weight vector w is set to M' (M'<M). In this case, the calculation amount necessary to calculate the above-described estimation function f(x) is M' calculations related to the kernel function, M' product-sum operations, and an addition of $w_0$. Thus, if the number of dimensions of the feature quantity vector x is set to d, the number of product-sum operations necessary for the calculation becomes approximately d×M'. Here, SVM has been described, but a calculation amount of the same level (d×M' product-sum operations) is also necessary in the case of RVM. In this regard, the number of elements, M', of the weight vector w remaining without converging to 0 in the case of RVM is less than in SVM. Thus, the calculation amount of the estimation function f(x) obtained by RVM is less than the calculation amount of the estimation function f(x) obtained by SVM.

As described above, SVM/SVR and RVM use the non-linear kernel function k as the basis function $\phi_m$. Thus, even when there is non-linearity between a feature quantity vector $x_j$ and an objective variable $t_j$, it is possible to obtain the estimation function f(x) capable of accurately fitting a set of the feature quantity vector $x_j$ and the objective variable $t_j$. However, the calculation amount of the estimation function f(x) obtained by SVM/SVR or RVM is greater than the calculation amount of the estimation function f(x) obtained by linear regression/discrimination.

A technique selectively using only part of a feature quantity vector x has been designed. For example, the estimation function f(x) is generated using only d' (d'<d)-dimensional elements in a d-dimensional feature quantity vector x by the technique. If this technique is applied, the calculation amount of the estimation function f(x) can be approximately d'/d. However, it is difficult to select an appropriate element from the feature quantity vector x in the non-linear model such as SVM/SVR or RVM. For this reason, a new learning algorithm is required, in which the fitting accuracy is high as in SVM/SVR and RVM and the calculation amount of the estimation function f(x) is small.

SUMMARY

The above-described learning algorithm receives a feature quantity vector $x=\{x_1, \ldots, x_m\}$ and generates an estimation function $f(x)=\Sigma w_m \phi_m(x)+w_0$ in which basis functions $\phi_m(x)$ (m=1 to M) for outputting a scalar quantity are linearly combined by machine learning. Specifically, when a feature quantity vector $x_j$ (j=1 to N) and an objective variable $t_j$ are given, an estimation function f(x) for estimating an estimation value y of an objective variable t from a feature quantity vector x is obtained.

In the case of linear regression/discrimination, a model of $\phi_m(x)=x_m$ is used. Thus, if there is non-linearity between the given feature quantity vector $x_j$ and objective variable $t_j$, it is difficult to accurately fit a set of the feature quantity vector $x_j$ and the objective variable $t_j$ by an estimation function f based on the model. That is, the estimation accuracy of the estimation function f is reduced. On the other hand, in the case of SVM/SVR and RVM, a model having $\phi_m(x)$ as a non-linear kernel function is used. Thus, even when there is non-linearity between the given feature quantity vector $x_j$ and objective variable $t_j$, it is possible to accurately fit the set of the feature quantity vector $x_j$ and the objective variable $t_j$ by the estimation function f based on the model. As a result, an estimation function f capable of accurately estimating an estimation value y from a feature quantity vector x is obtained.

However, a calculation amount necessary to calculate an estimation function f(x) obtained by SVM/SVR or RVM is greater than a calculation amount necessary to calculate an estimation function f(x) obtained by linear regression/discrimination. On the other hand, if there is non-linearity between the feature quantity vector $x_j$ and the objective variable $t_j$, the estimation accuracy of an estimation function f obtained by linear regression/discrimination is less than the estimation accuracy of an estimation function f obtained by SVM/SVR or RVM.

It is desirable to provide a novel and improved information processing device, information processing method, and program that can generate an estimation function further reducing a calculation amount while maintaining estimation accuracy.

According to an embodiment of the present disclosure, there is provided an information processing device which includes an input unit for inputting a feature quantity vector and an objective variable corresponding to the feature quantity vector, a basis function generation unit for generating a basis function for outputting a scalar quantity by mapping the feature quantity vector, a scalar quantity calculation unit for mapping the feature quantity vector using the basis function generated by the basis function generation unit and calculating the scalar quantity corresponding to the feature quantity vector, a basis function evaluation unit for evaluating whether or not the basis function used to calculate the scalar quantity is useful for estimating the objective variable using the objective variable input by the input unit along with the scalar quantity calculated by the scalar quantity calculation unit and the feature quantity vector corresponding to the scalar quantity, an estimation function generation unit for generating an estimation function for estimating the objective variable from the scalar quantity by machine learning on the basis of the scalar quantity calculated by the scalar quantity calculation unit and the objective variable corresponding to the scalar quantity using the basis function evaluated to be useful by the basis function evaluation unit, and an output unit for outputting the estimation function generated by the estimation function generation unit.

The basis function generation unit may generate the basis function for outputting the scalar quantity by mapping only part of the feature quantity vector.

The information processing device may further include a generation alternation unit for generating a next-generation basis function by executing selection of the useful basis function, generation of a new basis function by mutation and crossover using the useful basis function, and random generation of the new basis function on the basis of an evaluation result by the basis function evaluation unit. Processing of generating the estimation function by the estimation function generation unit, processing of generating the next-generation basis function by the generation alternation unit, processing of calculating the scalar quantity by the scalar quantity calculation unit, and processing of evaluating the basis function by the basis function evaluation unit may be iteratively executed.

The basis function evaluation unit may execute regression or discrimination learning for estimating the objective variable corresponding to the scalar quantity while selecting the scalar quantity according to an information quantity criterion, and may evaluate that the basis function used to calculate the scalar quantity selected according to the information quantity criterion is useful.

The estimation function generation unit may sequentially add the basis function evaluated to be useful by the basis function evaluation unit to the estimation function.

According to another embodiment of the present disclosure, there is provided an information processing method which includes inputting a feature quantity vector and an objective variable corresponding to the feature quantity vector, generating a basis function for outputting a scalar quantity by mapping the feature quantity vector, mapping the feature quantity vector using the basis function and calculating the scalar quantity corresponding to the feature quantity vector, evaluating whether or not the basis function used to calculate the scalar quantity is useful for estimating the objective variable using the objective variable along with the scalar quantity and the feature quantity vector corresponding to the scalar quantity, generating an estimation function for estimating the objective variable from the scalar quantity by machine learning on the basis of the scalar quantity and the objective variable corresponding to the scalar quantity using the basis function evaluated to be useful, and outputting the estimation function.

According to another embodiment of the present disclosure, there is provided a program for causing a computer to execute an input function of inputting a feature quantity vector and an objective variable corresponding to the feature quantity vector, a basis function generation function of generating a basis function for outputting a scalar quantity by mapping the feature quantity vector, a scalar quantity calculation function of mapping the feature quantity vector using the basis function generated by the basis function generation function and calculating the scalar quantity corresponding to the feature quantity vector, a basis function evaluation function of evaluating whether or not the basis function used to calculate the scalar quantity is useful for estimating the objective variable using the objective variable input by the input function along with the scalar quantity calculated by the scalar quantity calculation function and the feature quantity vector corresponding to the scalar quantity, an estimation function generation function of generating an estimation function for estimating the objective variable from the scalar quantity by machine learning on the basis of the scalar quantity calculated by the scalar quantity calculation function and the objective variable corresponding to the scalar quantity using the basis function evaluated to be useful by the basis function evaluation function, and an output function of outputting the estimation function generated by the estimation function generation function.

According to another embodiment of the present disclosure, there is provided a computer-readable recording medium in which the program is recorded.

According to the embodiments of the present disclosure described above, it is possible to generate an estimation function further reducing a calculation amount while maintaining estimation accuracy.

BRIEF DESCRIPTION OF THE DRAWINGS

FIG. 2 is an illustrative diagram illustrating a configuration example of learning data according to the same embodiment;

FIG. 3 is an illustrative diagram illustrating a calculation example of a basis function according to the same embodiment;

DETAILED DESCRIPTION OF THE EMBODIMENT(S)

Figure 1:
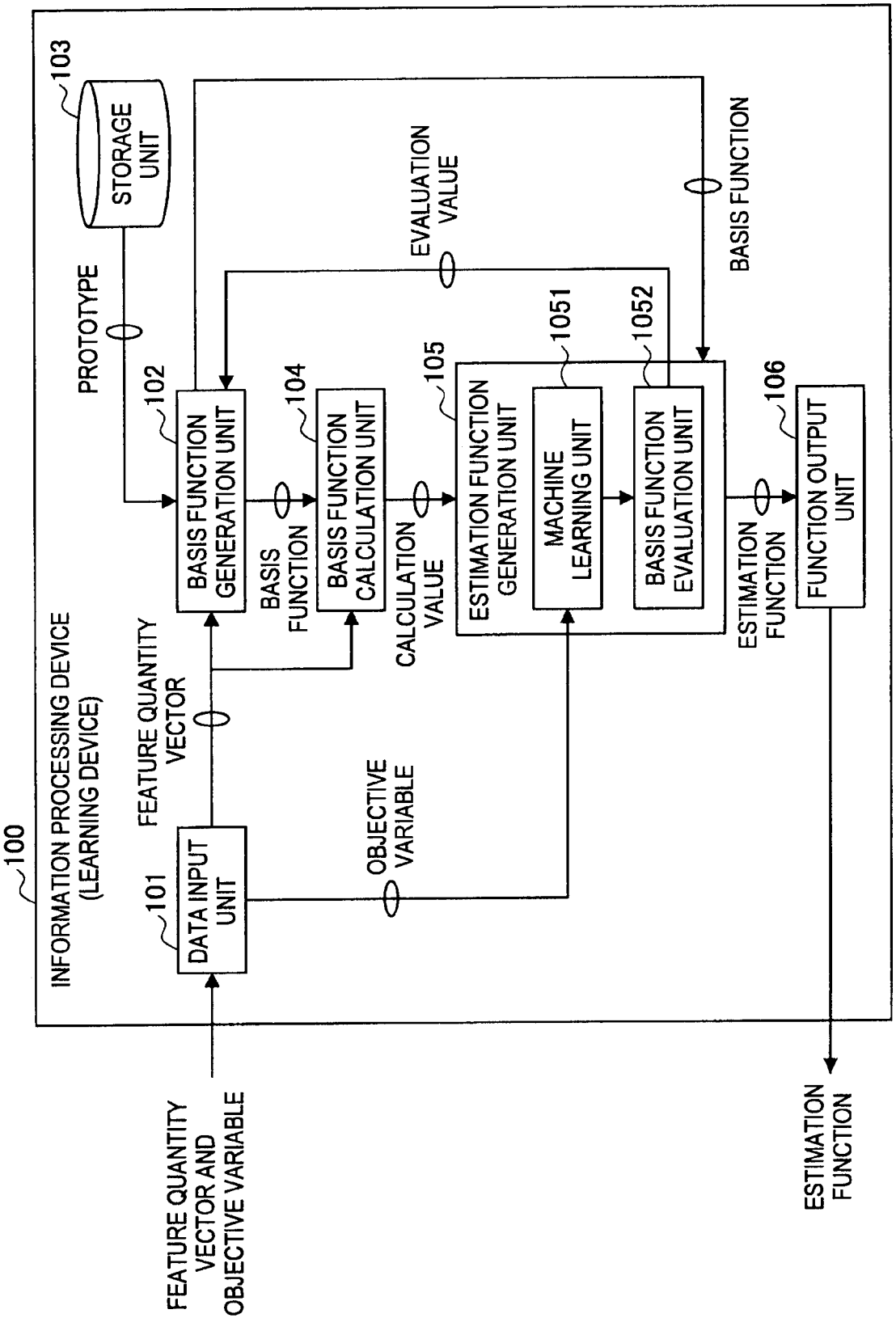
FIG. 1 is an illustrative diagram illustrating a functional configuration of an information processing device (learning device) according to a first embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

[Description Flow]

Here, the description flow related to embodiments of the present disclosure disclosed below will be briefly described.

A functional configuration of an information processing device 100 (a learning device) according to a first embodiment of the present disclosure will be described with reference to FIG. 1. Herein, a configuration of learning data used upon execution of a learning algorithm according to the same embodiment and configurations of a basis function and an estimation function obtained by the learning algorithm will be described with reference to FIGS. 2 to 5. Then, a flow of processing related to the learning algorithm of the same embodiment will be described with reference to FIGS. 6 to 14.

Next, a functional configuration of the information processing device 100 (the learning device) according to a second embodiment of the present disclosure will be described with reference to FIG. 15. Then, a flow of processing related to the learning algorithm of the same embodiment will be described with reference to FIGS. 16 to 18. Next, hardware configurations capable of implementing functions of the information processing devices 100 according to the first and second embodiments of the present disclosure will be described with reference to FIG. 19. Finally, technical ideas of the same embodiment will be summarized and function effects obtained from the technical ideas will be briefly described.

2. First Embodiment
  2-1: Functional Configuration of Information Processing Device 100 (Learning Device)
  2-2: Flow of Learning Processing
    2-2-1: Entire Configuration
    2-2-2: Generation of Basis Function (S102)
    2-2-3: Calculation of Basis Function (S103)
    2-2-4: Basis Function Evaluation/Estimation Function Generation (S104)
3: Second Embodiment
  3-1: Functional Configuration of Information Processing Device 100 (Learning Device)
  3-2: Flow of Learning Processing
    3-2-1: Entire Configuration
    3-2-2: Evaluation of Basis Function (S206)
    3-2-3: Generation of Estimation Function (S207)
4. Hardware Configuration
5. Summary 2. First Embodiment Hereinafter, the first embodiment of the present disclosure will be described. This embodiment relates to a learning algorithm for generating an estimation function f(x) for estimating an estimation value y of an objective variable t from the feature quantity vector x if M feature quantity vectors $x^{(m)}$ (m=1 to M) and an objective variable $t^{(m)}$ corresponding to each feature quantity vector $x^{(m)}$ are given. In particular, this embodiment relates to a learning algorithm for accurately fitting a set of the feature quantity vector $x^{(m)}$ and the objective variable $t^{(m)}$ and generating a sparse estimation function f(x) having a small calculation load.

[2-1: Functional Configuration of Information Processing Device 100 (Learning Device)]

First, the functional configuration of the information processing device 100 (the learning device) capable of implementing the learning algorithm according to this embodiment will be described with reference to FIG. 1. FIG. 1 is an illustrative diagram illustrating the functional configuration of the information processing device 100 (the learning device) capable of implementing the learning algorithm according to this embodiment.

As shown in FIG. 1, the information processing device 100 is mainly constituted by a data input unit 101, a basis function generation unit 102, a storage unit 103, a basis function calculation unit 104, an estimation function generation unit 105, and a function output unit 106. The estimation function generation unit 105 includes a machine learning unit 1051 and a basis function evaluation unit 1052.

First, feature quantity vectors $x^{(n)}$ (n=1 to N) and an objective variable $t^{(n)}$ corresponding to each feature quantity vector $x^{(n)}$ are input to the data input unit 101 as the learning data. For example, as shown in FIG. 2, N feature quantity vectors $x^{(1)}$ to $x^{(N)}$ and objective variables $t^{(1)}$ to $t^{(N)}$ are input to the data input unit 101 as learning data Data 1 to Data N. In each feature quantity vector $x^{(n)}$, the number of dimensions is D. The feature quantity vector input to the data input unit 101 is input to the basis function generation unit 102 and the basis function calculation unit 104. On the other hand, the objective variable t input to the data input unit 101 is input to the machine learning unit 1051 included in the estimation function generation unit 105.

If the feature quantity vector is input, the basis function generation unit 102 randomly selects a predetermined number of prototypes from among prototypes of the basis function already prepared in the storage unit 103. As the prototypes of the basis function, for example, a linear term shown in the following Equation (4), a Gaussian kernel shown in the following Equation (5), a sigmoid kernel shown in the following Equation (6), and trigonometric functions showing the following Equations (7) and (8) can be used. In this regard, x' is a vector obtained by extracting n-dimensional elements from the vector x. $x_a$ is an element of an a-th dimension of the vector x. The number of dimensions, m, of a, b, z', σ, and x' is a prototype parameter.

$$\phi(x) = x_a^b \quad (4)$$

$$\phi(x) = \exp\left(\frac{-|x' - z'|^2}{2\sigma^2}\right) \quad (5)$$

$$\phi(x) = \tanh(ax'^T z' + b) \quad (6)$$

$$\phi(x) = \sin(bx_a) \quad (7)$$

$$\phi(x) = \cos(bx_a) \quad (8)$$

The basis function generation unit 102 selecting prototypes generates a basis function by randomly deciding parameters of the selected prototypes. For example, if the linear term has been selected, the basis function generation unit 102 generates a basis function $\phi(x)$ (for example, $\phi(x)=x_1^2$ when a=1 and b=2) by randomly deciding parameters a and b (a=1 to D and b=1 to about 3).

If the Gaussian kernel has been selected, the basis function generation unit 102 first randomly decides the number of dimensions, E, (E=1 to D) of the vector x in which mapping is made by the parameter σ and the basis function $\phi(x)$ (for example, σ=0.1 and E=2). Next, the basis function generation unit 102 randomly decides an index d (d=1 to D) of a dimension to be used in the vector x (for example, d={3, 4}). Next, the basis function generation unit 102 randomly decides an index i (i=1 to N) of data to be used in a vector z' (for example, i=5). Next, the basis function generation unit 102 decides each element $z'_k = x_{dk}^{(i)}$ (k=1 to E) of the vector z' (for example, $z' = \{x_3^{(5)}, x_4^{(5)}\}$).

Here, the case where the linear term has been selected and the case where the Gaussian kernel has been selected have been described, but the basis function $\phi(x)$ is also generated when other prototypes have been selected. As described above, the basis function generation unit 102 generates a predetermined number of basis functions by iteratively executing prototype selection and parameter decision. For example, M basis functions $\phi_1(x), \ldots, \phi_M(x)$ are generated by the basis function generation unit 102. The M basis functions $\phi_1(x), \ldots, \phi_M(x)$ generated by the basis function generation unit 102 are input to the basis function calculation unit 104.

If the M basis functions $\phi_1(x), \ldots, \phi_M(x)$ are input, the basis function calculation unit 104 maps the feature quantity vectors $x^{(1)}$ to $x^{(N)}$ input as learning data using the M basis functions $\phi_1(x), \ldots, \phi_M(x)$. For example, the feature quantity vectors $x^{(1)}$ to $x^{(N)}$ respectively corresponding to Data 1 to Data N input as the learning data are mapped by the M basis functions $\phi_1(x), \ldots, \phi_M(x)$, and the calculation result as shown in FIG. 3 is obtained. That is, calculation values $\phi_1(x^{(1)}), \ldots, \phi_M(x^{(1)}), \ldots, \phi_1(x^{(N)}), \ldots, \phi_M(x^{(N)})$ are calculated by the basis function calculation unit 104.

In the following description, the calculation value $\phi_m(x^{(i)})$ is denoted by $q_{mi}$. As described above, the calculation value $q_{mi}$ calculated by the basis function calculation unit 104 is input to the estimation function generation unit 105.

If the calculation value $q_{mi}$ is input, the estimation function generation unit 105 generates an estimation function f for estimating an objective variable $t^{(i)}$ from the input calculation value $q_{mi}$ by the function of the machine learning unit 1051. The estimation function f(x) is $f(x)=\Sigma w_m \phi_m(x)+w_0$. The machine learning unit 1051 obtains a vector $w=\{w_0, \ldots, w_M\}$ by linear regression/discrimination so that a set of the calculation value $q_{mi}=\phi_m(x^{(i)})$ and the objective variable $t^{(i)}$ (i=1 to N) is fitted by the estimation function f. At this time, the estimation function generation unit 105 selects the basis function $\phi_m(x)$ on the basis of a stepwise method based on an information quantity criterion (Akaike's information criterion (AIC)). Here, $w_m$ corresponding to the basis function $\phi_m(x)$, which has not been selected, becomes 0.

If the vector w is obtained by the machine learning unit 1051, the estimation function generation unit 105 sets an evaluation value $v_m$ of the basis function $\phi_m(x)$ by the function of the basis function evaluation unit 1052. For example, the basis function evaluation unit 1052 sets an evaluation value $v_m$ of the unselected basis function $\phi_m(x)$ to 0, and sets an evaluation value $v_m$ of the selected basis function $\phi_m(x)$ to 1. For example, if $w_{m'}=0$, the basis function evaluation unit 1052 sets an evaluation value $v_{m'}$ of a basis function $\phi_{m'}(x)$ corresponding to $w_{m'}$ to 0. If $w_{m'} \neq 0$, the basis function evaluation unit 1052 sets the evaluation value $v_{m'}$ of the basis function $\phi_{m'}(x)$ corresponding to $w_{m'}$ to 1.

By the above-described processing, a first-generation basis function $\phi_m(x)$ and an evaluation value $v_m$ of each basis function $\phi_m(x)$ are obtained. Next, the information processing device 100 inputs an evaluation value $v=\{v_1, \ldots, v_M\}$ set by the basis function evaluation unit 1052 to the basis function generation unit 102, and generates a second-generation basis function $\phi_m(x)$ on the basis of the evaluation value $\{v_1, \ldots, v_M\}$. Hereinafter, a τ-th-generation basis function is denoted by $\phi_{m,\tau}(x)$ and an evaluation value of the τ-th-generation basis function $\phi_{m,\tau}(x)$ is denoted by $v_\tau = \{v_{1,\tau}, \ldots, v_{M,\tau}\}$.

If the evaluation value $v_1 = \{v_{1,1}, \ldots, v_{M,1}\}$ is input, the basis function generation unit 102 selects a basis function $\phi_{m,1}$ of the evaluation value $v_{m,1} \neq 0$ on the basis of the input evaluation value $v_1$, and sets the basis function $\phi_{m,1}$ to a second-generation basis function $\phi_{m,2}$. If the number of non-zero elements in the evaluation value $v_1$ is e, e basis functions $\phi_{1,2}, \ldots, \phi_{e,2}$ are set by the basis function generation unit 102. The basis function generation unit 102 sets the number of second-generation basis functions, $M_2$ ($M_2 \geq e$). Next, the basis function generation unit 102 generates ($M_2-e$) basis functions $\phi_{e+1,2}, \ldots, \phi_{M2,2}$ by an evolutionary technique (mutation, crossover, or random generation).

First, the basis function generation unit 102 randomly selects a method of generating second-generation basis functions $\phi_{e+1,2}, \ldots, \phi_{M2,2}$ from among the mutation, the crossover, and the random generation.

(When Mutation has been Selected)

If the mutation has been selected as the method of generating the second-generation basis functions $\phi_{e+1,2}, \ldots, \phi_{M2,2}$, the basis function generation unit 102 first randomly selects one basis function $\phi_{m,2}$ from among basis functions $\phi_{1,2}, \ldots, \phi_{e,2}$. Next, the basis function generation unit 102 generates a new basis function $\phi_{m',2}$ ($m' \geq e+1$) by changing some prototype parameters constituting the selected basis function $\phi_{m,2}$. For example, the basis function generation unit 102 generates a new basis function $\phi_{m',2}(x)=x_1^2$ by randomly changing a parameter of the selected basis function $\phi_{m,2}(x)=x_5^2$ (linear term).

If the selected basis function $\phi_{m,2}$ is the Gaussian kernel, the basis function generation unit 102 generates the new basis function $\phi_{m',2}$ ($m' \geq e+1$) by randomly changing parameters $\sigma$, E, d, z', and the like. For example, if the parameters of the basis function $\phi_{m,2}$ are $\sigma=0.2$, $d=\{2, 3, 4\}$, and $z'=\{0.1, 0.4, 0.5\}$, the basis function generation unit 102 changes the parameters like $\sigma=0.3$, $d=\{1, 2, 3, 5\}$, and $z'=\{0.2, 0.1, 0.0, 0.3\}$. In this example, a first dimension is added to d, a value of z' corresponding a third dimension is changed from 0.4 to 0.0, a fourth dimension is changed to a fifth dimension, and $\sigma$ is changed to 0.3. The value of z' corresponding to a newly added dimension is randomly set.

Here, the linear term and the Gaussian kernel have been described, but parameters are also changed for other prototypes and a new basis function is generated.

(When Crossover has been Selected)

If the crossover has been selected as the method of generating the second-generation basis functions $\phi_{e+1,2}, \ldots, \phi_{M2,2}$, the basis function generation unit 102 first randomly selects two basis functions $\phi_{m1,2}$ and $\phi_{m2,2}$ having the same prototype from among basis functions $\phi_{1,2}, \ldots, \phi_{e,2}$. Next, the basis function generation unit 102 exchanges some parameters of the selected basis function $\phi_{m1,2}$ and some parameters of the selected basis function $\phi_{m2,2}$. For example, if $\phi_{1,2}(x)=x_5^2$ and $\phi_{m2,2}(x)=x_2^3$ have been selected, the basis function generation unit 102 combines some parameters of the two and generates a new basis function $\phi_{m',2}(x)=x_5^3$ ($m' \geq e+1$).

The case where a Gaussian kernel having parameters $d=\{1, 2\}$, $z'=\{0.2, 0.3\}$, and $\sigma=0.1$ and a Gaussian kernel having parameters $d=\{2, 3, 4\}$, $z'=\{0.1, 0.4, 0.5\}$, and $\sigma=0.2$ have been selected is considered as another example. In this case, the basis function generation unit 102 combines some parameters corresponding to each other, and, for example, generates parameters $d=\{1, 2, 4\}$, $z'=\{0.2, 0.1, 0.5\}$, and $\sigma=0.1$. The basis function generation unit 102 sets a Gaussian kernel having these parameters to a new basis function $\phi_{m',2}$.

(When Random Generation has been Selected)

If the random generation has been selected as the method of generating the second-generation basis functions $\phi_{e+1,2}, \ldots, \phi_{M2,2}$, the basis function generation unit 102 first randomly selects a prototype. Next, the basis function generation unit 102 randomly decides parameters of the randomly selected prototype and generates a new basis function $\phi_{m',2}(x)$ ($m' \geq e+1$). A method of generating the basis function $\phi_{m',2}$ by the random generation is substantially the same as the method of generating the first-generation basis function $\phi_{m,1}$.

The basis function $\phi_{m,2}$ ($m=1$ to $M2$) generated by the basis function generation unit 102 as described above is input to the basis function calculation unit 104.

If the second-generation basis functions $\phi_{1,2}(x), \ldots, \phi_{M2,2}(x)$ are input, the basis function calculation unit 104 maps feature quantity vectors $x^{(1)}$ to $x^{(N)}$ input as learning data using the basis functions $\phi_{1,2}(x), \ldots, \phi_{M2,2}(x)$. That is, calculation values $\phi_{1,2}(x^{(1)}), \ldots, \phi_{M2,2}(x^{(1)}), \ldots, \phi_{1,2}(x^{(N)}), \ldots, \phi_{2,2}(x^{(N)})$ are calculated by the basis function calculation unit 104. The calculation value $\phi_{m,2}(x^{(i)})$ is denoted by $q_{mi}$. As described above, the calculation value $q_{mi}$ calculated by the basis function calculation unit 104 is input to the estimation function generation unit 105.

If the calculation value $q_{mi}$ is input, the estimation function generation unit 105 generates an estimation function f for estimating an objective variable $t^{(i)}$ from the input calculation value $q_{mi}$ by the function of the machine learning unit 1051. The estimation function $f(x)$ is $f(x)=\Sigma w_m \phi_{m,2}(x)+w_0$. The machine learning unit 1051 obtains a vector $w=\{w_0, \ldots, w_M\}$ by linear regression/discrimination so that a set of the calculation value $q_{mi}=\phi_{m,2}(x^{(i)})$ and the objective variable $t^{(i)}$ ($i=1$ to N) is fitted by the estimation function f. At this time, the estimation function generation unit 105 selects the basis function $\phi_{m,2}(x)$ on the basis of a stepwise method based on an information quantity criterion (AIC). Here, $w_m$ corresponding to the basis function $\phi_{m,2}(x)$, which has not been selected, becomes 0.

If the vector w is obtained by the machine learning unit 1051, the estimation function generation unit 105 sets an evaluation value $v_{m,2}$ of the basis function $\phi_{m,2}(x)$ by the function of the basis function evaluation unit 1052. For example, the basis function evaluation unit 1052 sets an evaluation value $v_{m,2}$ of the unselected basis function $\phi_{m,2}(x)$ to 0, and sets an evaluation value $v_{m,2}$ of the selected basis function $\phi_{m,2}(x)$ to 1. For example, if $w_{m',2}=0$, the basis function evaluation unit 1052 sets an evaluation value $v_{m',2}$ of a basis function $\phi_{m',2}(x)$ corresponding to $w_{m',2}$ to 0. If $w_{m',2} \neq 0$, the basis function evaluation unit 1052 sets the evaluation value $v_{m',2}$ of the basis function $\phi_{m',2}(x)$ corresponding to $w_{m',2}$ to 1.

By the above-described processing, a second-generation basis function $\phi_{m,2}(x)$ and an evaluation value $v_{m,2}$ of each basis function $\phi_{m,2}(x)$ are obtained. Next, the information processing device 100 inputs an evaluation value $v_2=\{v_{1,2}, \ldots, v_{M2,2}\}$ set by the basis function evaluation unit 1052 to the basis function generation unit 102, and generates a third-generation basis function $\phi_{m,3}(x)$ on the basis of the evaluation value $\{v_{1,2}, \ldots, v_{M2,2}\}$. A method of generating a $\tau$-th-generation basis function $\phi_{m,\tau}(x)$ ($\tau \geq 3$) is substantially the same as the method of generating the second-generation basis function $\phi_{m,2}(x)$. A method of calculating an evaluation value $v_{m,\tau}$ of the basis function $\phi_{m,\tau}(x)$ is substantially the same as the method of calculating the evaluation value $v_{m,2}$ of the basis function $\phi_{m,2}(x)$.

The information processing device 100 iteratively executes the above-described processing by the basis function generation unit 102, the basis function calculation unit 104, and the estimation function generation unit 105, thereby generating the $\tau$-th-generation basis function $\phi_{m,\tau}(x)$ and calculating the evaluation value $v_{m,\tau}$ of the basis function $\phi_{m,\tau}(x)$. As described above, iterative processing is executed on the basis of the evolutionary technique, so that an estimation function $f(x)$ capable of accurately estimating an estimation value y of an objective function t from a feature quantity vector x is obtained. If a predetermined termination condition has been satisfied, the above-described iterative processing is terminated. The predetermined termination conditions include, for example, when stop manipulation has been performed by a user, when iterative processing has been completed a predetermined number of times, when an AIC value has not been updated a predetermined number of times, and the like.

If the predetermined termination condition has been satisfied, the estimation function generation unit 105 generates the estimation function f(x) on the basis of a of a τ-th-generation basis function $\phi_{m,\tau}$ (m=1 to $M_\tau$) and a weight vector w having a largest AIC value. At this time, the basis function $\phi_{m,\tau}$ corresponding to a zero element in the weight vector w is discarded. The estimation function f(x) generated by the estimation function generation unit 105 is input to the function output unit 106. If the estimation function f(x) is input, the function output unit 106 outputs the input estimation function f(x).

Figure 4:
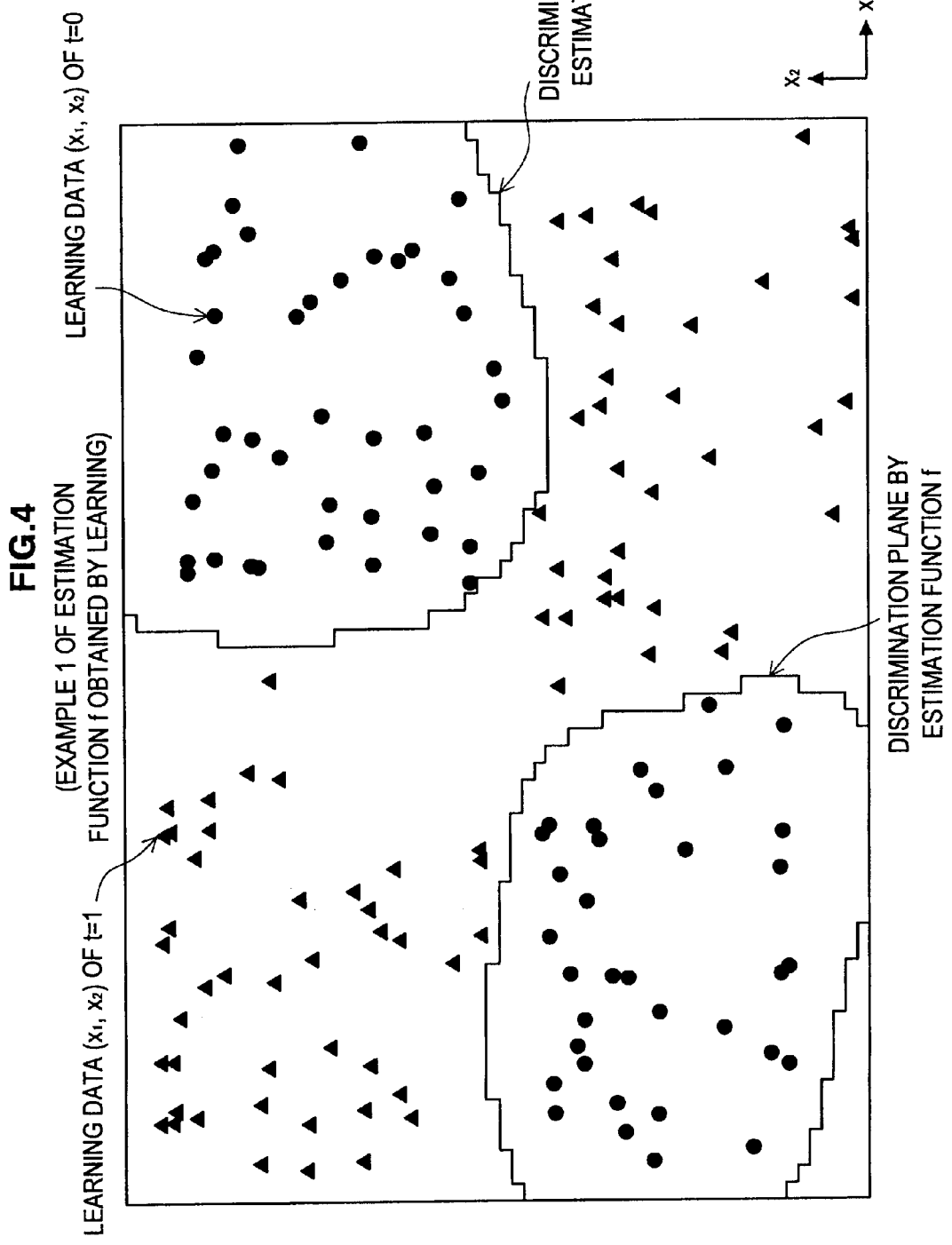
FIG. 4 is an illustrative diagram illustrating an estimation function obtained by a learning algorithm according to the same embodiment.

Here, an example of an output result of the estimation function f(x) obtained when a large number of sets of an objective variable t=1 and feature quantity vectors $x=(x_1, x_2)$ and a large number of sets of an objective variable t=0 and feature quantity vectors $x=(x_1, x_2)$ are given as learning data is shown in FIG. 4. In FIG. 4, a triangle mark is plotted in a position of a feature quantity vector x corresponding to the objective variable t=1, and a circle mark is plotted in a position of a feature quantity vector x corresponding to the objective variable t=0. Further, in FIG. 4, a discrimination plane by the estimation function f(x) calculated on the basis of the learning data is indicated by the solid line. In the example of FIG. 4, the triangle mark and the circle mark are clearly divided by the discrimination plane by the estimation function f(x).

An algorithm of the estimation function f(x) as described below is obtained from the learning data shown in FIG. 4. In this regard, N0 is an output value of the estimation function f(x), and Data[0] and Data[1] correspond to the feature quantity vector x.

(Example 1 of Estimation Function f(x))

$$N0 = (\exp(-(pow(\text{Data}[0] - 0.50358683, 2))/0.00069347367) *$$
$$0.4796491139352305 +$$
$$\exp(-(pow(\text{Data}[0] - 0.38617584, 2) + pow(\text{Data}[1] - 0.88589209,$$
$$2))/0.021929562) * -0.9224064456400292 +$$
$$\exp(-(pow(\text{Data}[0] - 0.78311056, 2) + pow($$
$$\text{Data}[1] - 0.20539419, 2))/0.010023744) *$$
$$-1.10236298660953 + \exp(-(pow(\text{Data}[0] - 0.78311056, 2) +$$
$$pow(\text{Data}[1] - 0.20539419, 2))/0.069347367) *$$
$$-2.769727885298161 + \exp(-(pow(\text{Data}[0] - 0.14187251, 2) +$$
$$pow(\text{Data}[1] - 0.71369296, 2))/0.069347367) *$$
$$-1.235677130784882 + \exp(-(pow(\text{Data}[0] - 0.78311056, 2) +$$
$$pow(\text{Data}[1] - 0.20539419, 2))/0.022963073) *$$
$$2.6693428865776 + \exp(-(pow(\text{Data}[0] - 0.34576759, 2) +$$
$$pow(\text{Data}[1] - 0.63278008, 2))/0.010023744) *$$
$$-0.5476941803120182 + \exp(-(pow(\text{Data}[0] - 0.70230204, 2) +$$
$$pow(\text{Data}[1] - 0.49170125, 2))/0.010023744) *$$
$$-0.3368579612750615 + 1.101241695541876);$$

Figure 5:
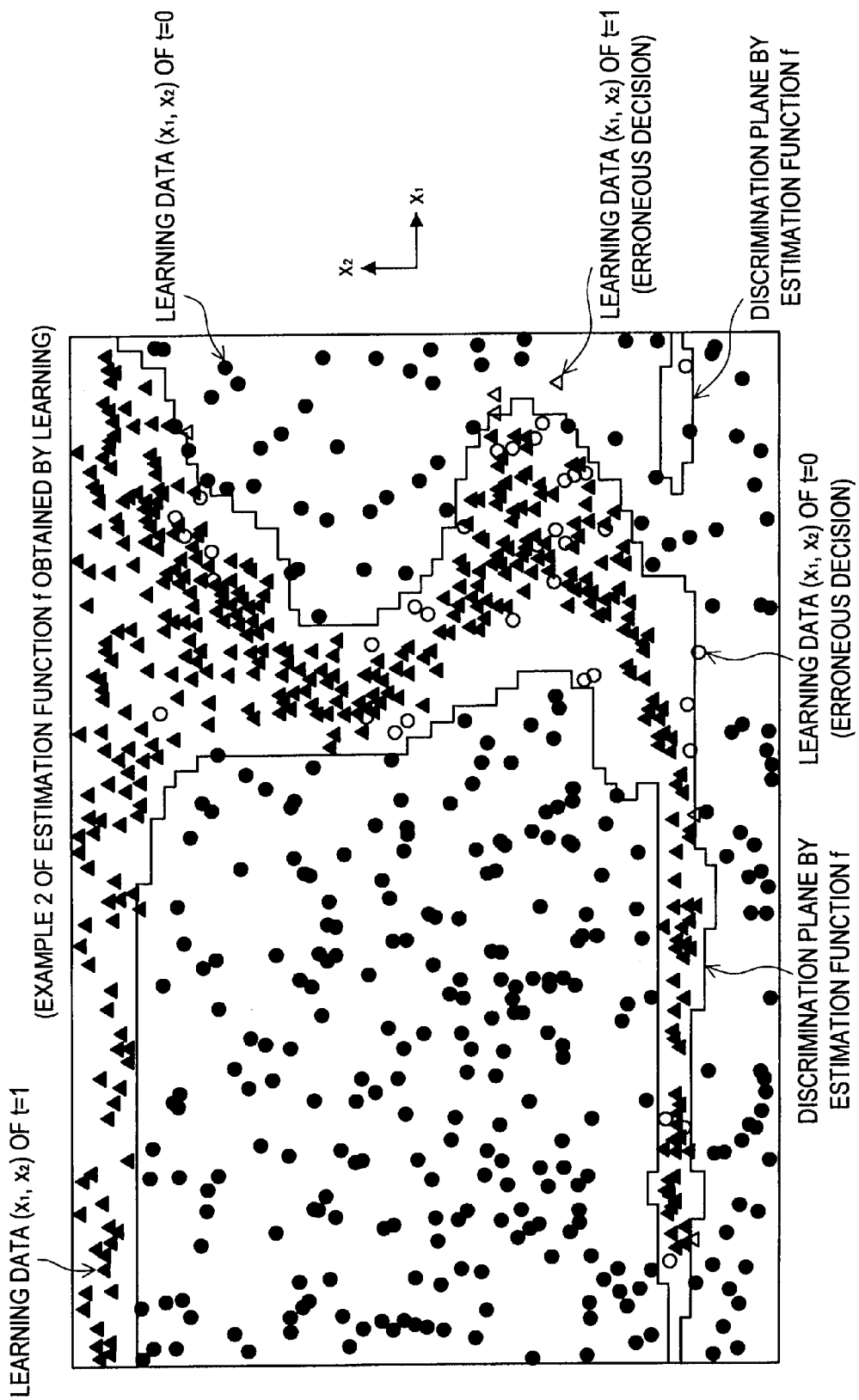
FIG. 5 is an illustrative diagram illustrating an estimation function obtained by a learning algorithm according to the same embodiment.

The same calculation result is also shown in FIG. 5. The example of FIG. 5 is a calculation result when learning data has been given to be a more complex discrimination plane than in FIG. 4. In FIG. 5, a white triangle mark and a white circle mark are plotted. The white triangle mark and the white circle mark indicate erroneously discriminated points. That is, the white triangle mark should be determined to be a point corresponding to an objective variable t=1, but is estimated as a point corresponding to an objective variable t=0 by the estimation function f(x). Also, the white circle mark should be determined to be a point corresponding to an objective variable t=0, but is estimated as a point corresponding to an objective variable t=1 by the estimation function f(x).

An algorithm of the following estimation function f(x) is obtained from learning data shown in FIG. 5. In this regard, N0 is an output value of the estimation function f(x), and Data[0] and Data[1] correspond to the feature quantity vector x.

(Example 2 of Estimation Function f(x))

$$N0 =$$
$$(\exp(-(pow(\text{Data}[0] - 0.7211858, 2) + pow(\text{Data}[1] - 0.97717839, 2))/$$
$$0.022963073) * -1.049069329783562 +$$
$$\exp(-(pow(\text{Data}[0] - 0.63127691, 2) +$$
$$pow(\text{Data}[1] - 0.34439835, 2))/0.0063245553) *$$
$$2.8190797768422 + \exp(-(pow(\text{Data}[0] - 0.61364853, 2) +$$
$$pow(\text{Data}[1] - 0.34439835, 2))/0.0063245553) *$$
$$-2.37930857487981 + \exp(-(pow(\text{Data}[0] - 0.61080819, 2) +$$
$$pow(\text{Data}[1] - 0.035269711, 2))/0.0024045287) *$$
$$-0.5946782556601005 + \exp(-(pow(\text{Data}[0] - 0.87150288, 2) +$$
$$pow(\text{Data}[1] - 0.035269711, 2))/$$
$$0.0036394019) * -0.6987029150714169 +$$
$$\exp(-(pow(\text{Data}[1] - 0.85269707, 2))/0.00063245557) *$$
$$0.6775503392921813 +$$
$$\exp(-(pow(\text{Data}[0] - 0.71162122, 2) +$$
$$pow(\text{Data}[1] - 0.78423238, 2))/0.0036394019) *$$
$$0.3436486184353701 + \exp(-(pow(\text{Data}[0] - 0.81843805, 2) +$$
$$pow(\text{Data}[1] - 0.43360996, 2))/0.0072615612) *$$
$$-0.914378338507427 + \exp(-(pow(\text{Data}[0] - 0.3543759, 2) +$$
$$pow(\text{Data}[1] - 0.86514521, 2))/0.0045817355) *$$
$$0.3784731062546026 + \exp(-(pow(\text{Data}[0] - 0.16930713, 2) +$$
$$pow(\text{Data}[1] - 0.85062242, 2))/0.0045817355) *$$
$$0.4832852944216888 + \exp(-(pow(\text{Data}[0] - 0.88084185, 2) +$$
$$pow(\text{Data}[1] - 0.62655604, 2))/0.0055084573) *$$
$$0.4897684309617601 + \exp(-(pow(\text{Data}[0] - 0.88952655, 2) +$$
$$pow(\text{Data}[1] - 0.25518674, 2))/0.0036394019) *$$
$$-0.5955577705301611 + \exp(-(pow(\text{Data}[0] - 0.52727592, 2) +$$
$$pow(\text{Data}[1] - 0.34439835, 2))/0.0063245553) *$$
$$-0.07222350662639272 + \exp(-(pow(\text{Data}[0] - 0.80200863, 2) +$$
$$pow(\text{Data}[1] - 0.86307055, 2))/0.0036394019) *$$

-continued $$-1.011609011416502 + \exp(-(pow(\text{Data}[0] - 0.73402309, 2) +$$
$$pow(\text{Data}[1] - 0.34439835, 2))/0.0063245553) *$$
$$-0.9673439001052475 + \exp(-(pow(\text{Data}[0] - 0.73601151, 2) +$$
$$pow(\text{Data}[1] - 0.020746889, 2))/$$
$$0.0063245553) * -1.254876057599521 +$$
$$\exp(-(pow(\text{Data}[0] - 0.73457676, 2))/0.028908795) *$$
$$1.030719900189407 +$$
$$\exp(-(pow(\text{Data}[1] - 0.076763488, 2))/0.00043755231) *$$
$$0.2406449857609962 +$$
$$\exp(-(pow(\text{Data}[0] - 1.0028695, 2) +$$
$$pow(\text{Data}[1] - 0.076763488, 2))/0.00087303162) *$$
$$-0.9178888798735231 + \exp(-(pow(\text{Data}[0] - 0.61514372, 2) +$$
$$pow(\text{Data}[1] - 0.67219919.2))/0.0041785925) *$$
$$-0.7921385857754228 + \exp(-(pow(\text{Data}[0] - 0.45754567, 2) +$$
$$pow(\text{Data}[1] - 0.88174272, 2))/0.0036394019) *$$
$$0.5846790563849728 + \exp(-(pow(\text{Data}[0] - 0.60011977, 2) +$$
$$pow(\text{Data}[1] - 0.78423238, 2))/0.0011508799) *$$
$$2.191183069444879 + \exp(-(pow(\text{Data}[0] - 0.58536583, 2) +$$
$$pow(\text{Data}[1] - 0.57468879, 2))/0.0036394019) *$$
$$-0.4392376886661116 + \exp(-(pow(\text{Data}[0] - 0.91248208, 2) +$$
$$pow(\text{Data}[1] - 0.080912866, 2))/0.0036394019) *$$
$$0.4574517539308264 + \text{Data}[0] * -0.07407166574269664 +$$
$$\exp(-(pow(\text{Data}[0] - 0.71162122, 2) + pow(\text{Data}[1] - 0.24273859,$$
$$2))/0.0045817355) * 0.1873713723186709 +$$
$$\exp(-(pow(\text{Data}[1] - 0.0062240665, 2))/0.0087303156) *$$
$$1.094461608751266 +$$
$$-0.01024187552521462);$$

If the learning algorithm according to this embodiment is used as described above, it is possible to accurately discriminate non-linear data. Because many parts using only some dimensions are included in the estimation function without using all dimensions of the feature quantity vector, a load related to the calculation of the estimation function is reduced. All dimensions of the feature quantity vector are used in all basis functions in the case of SVM, RVM, or the like. Accordingly, a calculation load of an estimation function generated by the learning algorithm according to this embodiment compared with SVM or RVM of the related art, or the like is small. Because the learning algorithm according to this embodiment can include a plurality of types of basis functions in an estimation function, it is possible to obtain an estimation function including a basis function having a small calculation load like a linear term. As a result, a calculation load of an estimation function is reduced as compared with that of the technique of the related art such as SVM, RVM, or the like.

The functional configuration of the information processing device 100 according to this embodiment has been described above. As described above, if the learning algorithm according to this embodiment is applied, it is possible to accurately discriminate data having non-linearity as in SVM, RVM, or the like, and automatically generate an estimation function having a small calculation load.

[2-2: Flow of Learning Processing]

Next, the flow of processing according to the learning algorithm of this embodiment will be described.

(2-2-1: Entire Configuration)

Figure 6:
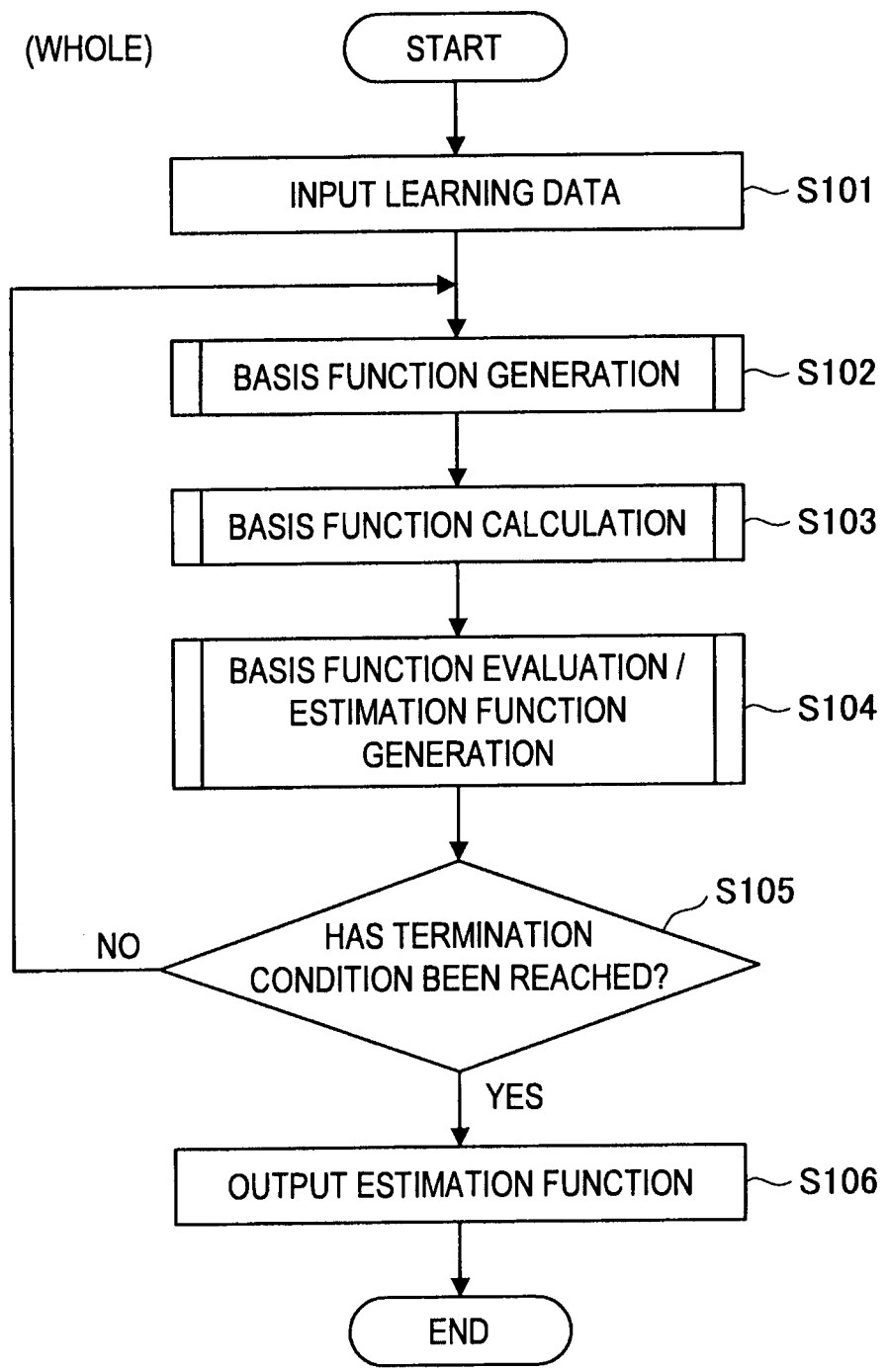
FIG. 6 is an illustrative diagram illustrating a flow of processing in the learning algorithm according to the same embodiment (the whole)

First, the entire processing flow according to the learning algorithm of this embodiment will be described with reference to FIG. 6. FIG. 6 is an illustrative diagram illustrating the entire processing flow related to the learning algorithm of this embodiment. The processing related to the learning algorithm of this embodiment is executed by the above-described information processing device 100.

As shown in FIG. 6, first, learning data is input to the information processing device 100 (S101). A set of a feature quantity vector x and an objective variable t as shown in FIG. 2 is input as the learning data. When the learning data is input, the information processing device 100 generates a basis function by the function of the basis function generation unit 102 (S102). Next, the information processing device 100 calculates a basis function by the function of the basis function calculation unit 104 (S103). That is, the information processing device 100 calculates a calculation value of the basis function by inputting the feature quantity vector x to the basis function generated in step S102. Next, the information processing device 100 performs basis function evaluation and estimation function generation by the function of the estimation function generation unit 105 (S104).

Next, the information processing device 100 determines whether or not a predetermined termination condition has been reached (S105). If the predetermined termination condition has been reached, the information processing device 100 moves the processing to step S106. On the other hand, if the predetermined terminal condition has not been reached, the information processing device 100 returns the processing to step S102 and iteratively executes the processing of steps S102 to S104. If the processing has moved to step S106, the information processing device 100 outputs an estimation function by the function of the function output unit 106 (S106). As described above, the processing of steps S102 to S104 is iteratively executed. In the following description, the basis function generated in step S102 in τ-th iterative processing is referred to as a τ-th-generation basis function.

(2-2-2: Generation of Basis Function (S102))

Here, the processing of step S102 (basis function generation) will be described in further detail with reference to FIGS. 7 to 12.

Figure 7:
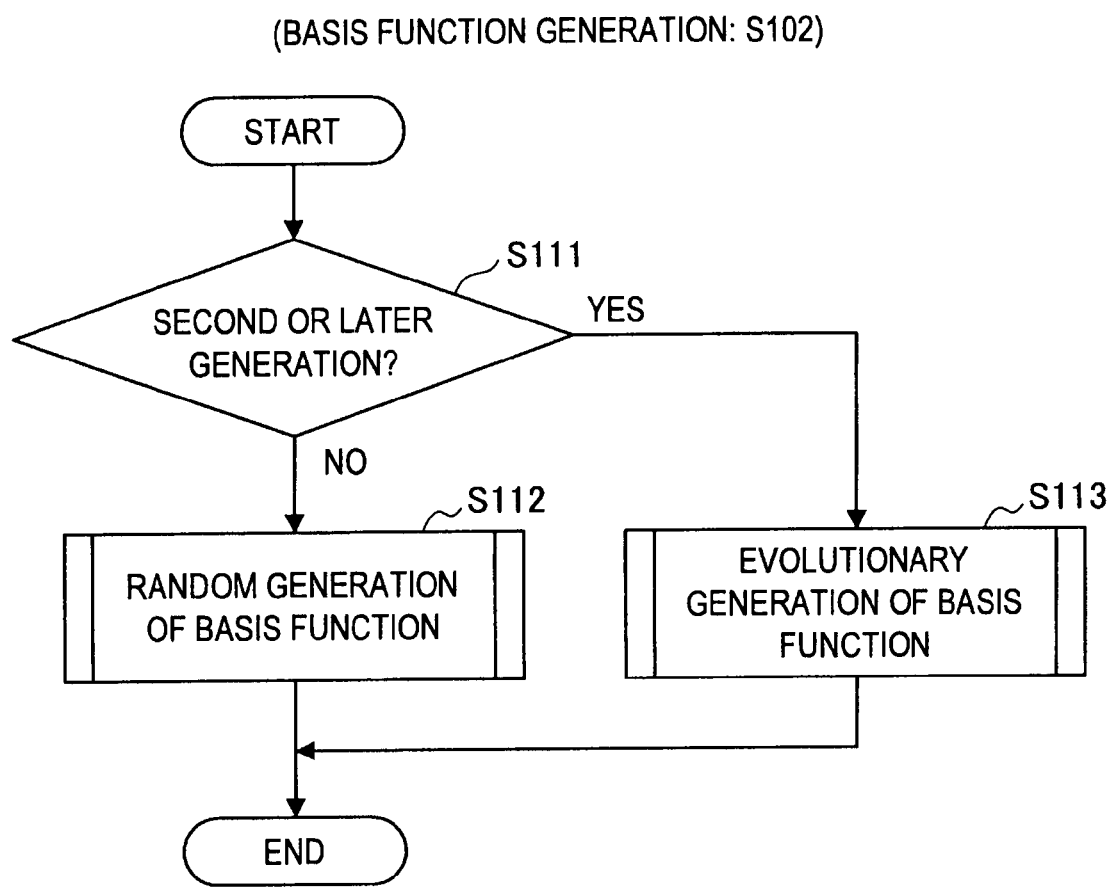
FIG. 7 is an illustrative diagram illustrating a flow of processing in the learning algorithm according to the same embodiment (generation of a basis function)

First, FIG. 7 will be referred to. As shown in FIG. 7, the information processing device 100 determines whether or not a current generation is a second or later generation (S111). That is, the information processing device 100 determines whether or not the processing of step S102 to be currently executed is second or later iterative processing. If it is the second or later generation, the information processing device 100 moves to step S113. On the other hand, if it is not the second or later generation (if it is a first generation), the information processing device 100 moves the processing to step S112. If the processing moves to step S112, the information processing device 100 randomly generates a basis function (S112). On the other hand, if the processing moves to step S113, the information processing device 100 evolutionarily generates the basis function (S113). If the processing of step S112 or S113 is completed, the information processing device 100 terminates the processing of step S102.

(S112: Random Generation of Basis Function)

Here, the processing of step S112 will be described in further detail with reference to FIGS. 8 and 9. The processing of step S112 relates to the processing of generating a first-generation basis function.

Figure 8:
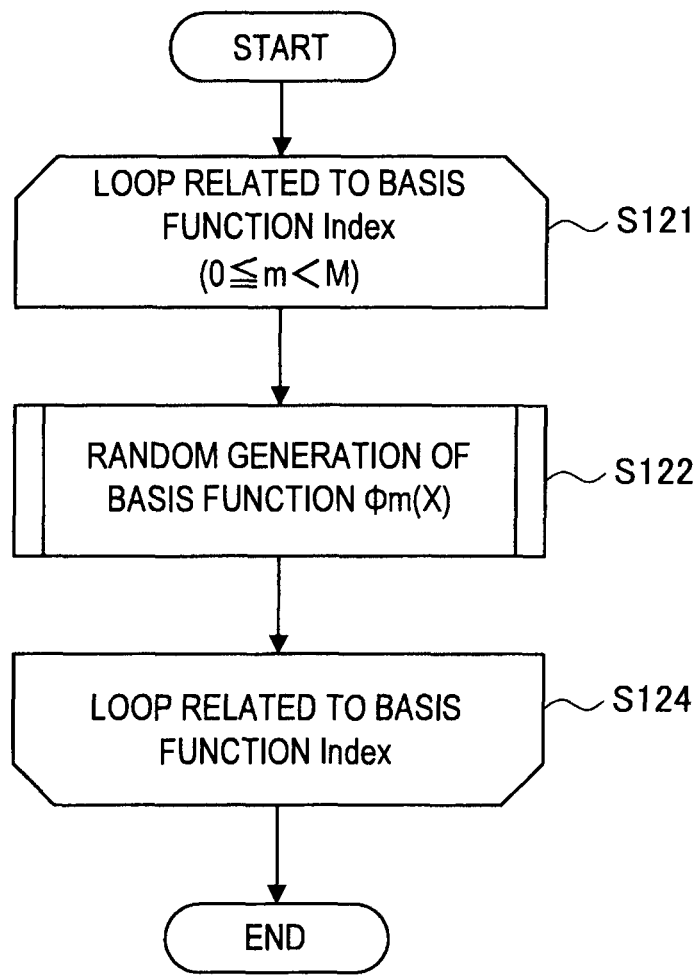
FIG. 8 is an illustrative diagram illustrating a flow of processing in the learning algorithm according to the same embodiment (random generation of a basis function)

First, FIG. 8 will be referred to. As shown in FIG. 8, the information processing device 100 starts a processing loop related to an index m (m=0 to M−1) of the basis function (S121). Next, the information processing device 100 randomly generates a basis function $\phi_m(x)$ (S122). Next, the information processing device 100 determines whether or not the index m of the basis function has reached M−1. If the index m of the basis function has not reached M−1, the information processing device 100 returns the processing to step S121 by incrementing the index m of the basis function (S124). On the other hand, if the index m of the basis function is m=M−1, the information processing device 100 terminates a processing loop (S124). If the processing loop is terminated in step S124, the information processing device 100 completes the processing of step S112.

(Details of Step S122)

Here, the processing of step S122 will be described in further detail with reference to FIG. 9.

Figure 9:
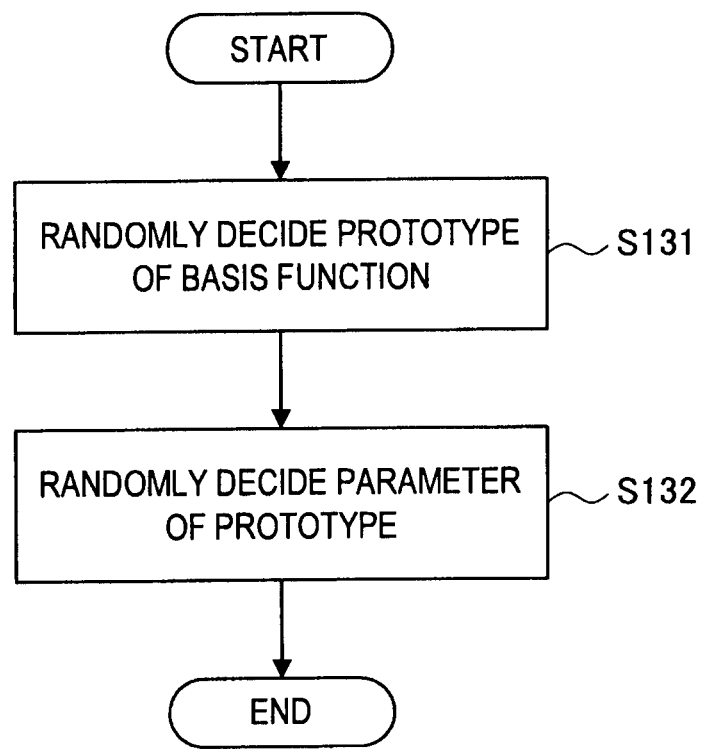
FIG. 9 is an illustrative diagram illustrating a flow of processing in the learning algorithm according to the same embodiment (random generation of a basis function)

If the processing of step S122 is started, the information processing device 100 randomly decides a basis function prototype as shown in FIG. 9 (S131). Any function for inputting a vector and outputting a scalar by designating a vector such as a linear term, a Gaussian kernel, a sigmoid kernel, or a trigonometric function is available as the prototype. Next, the information processing device 100 randomly decides a parameter of the decided prototype, and generates a basis function (S132).

(S113: Evolutionary Generation of Basis Function)

Next, the processing of step S113 will be described in further detail with reference to FIGS. 10 to 12. The processing of step S113 relates to the processing of generating a τ-th-generation (τ≥2) basis function. Accordingly, when step S113 is executed, a (τ−1)-th-generation basis function $\phi_{m,\tau-1}$ (m=1 to M) and an evaluation value $v_{m,\tau-1}$ of the basis function $\phi_{m,\tau-1}$ are obtained.

Figure 10:
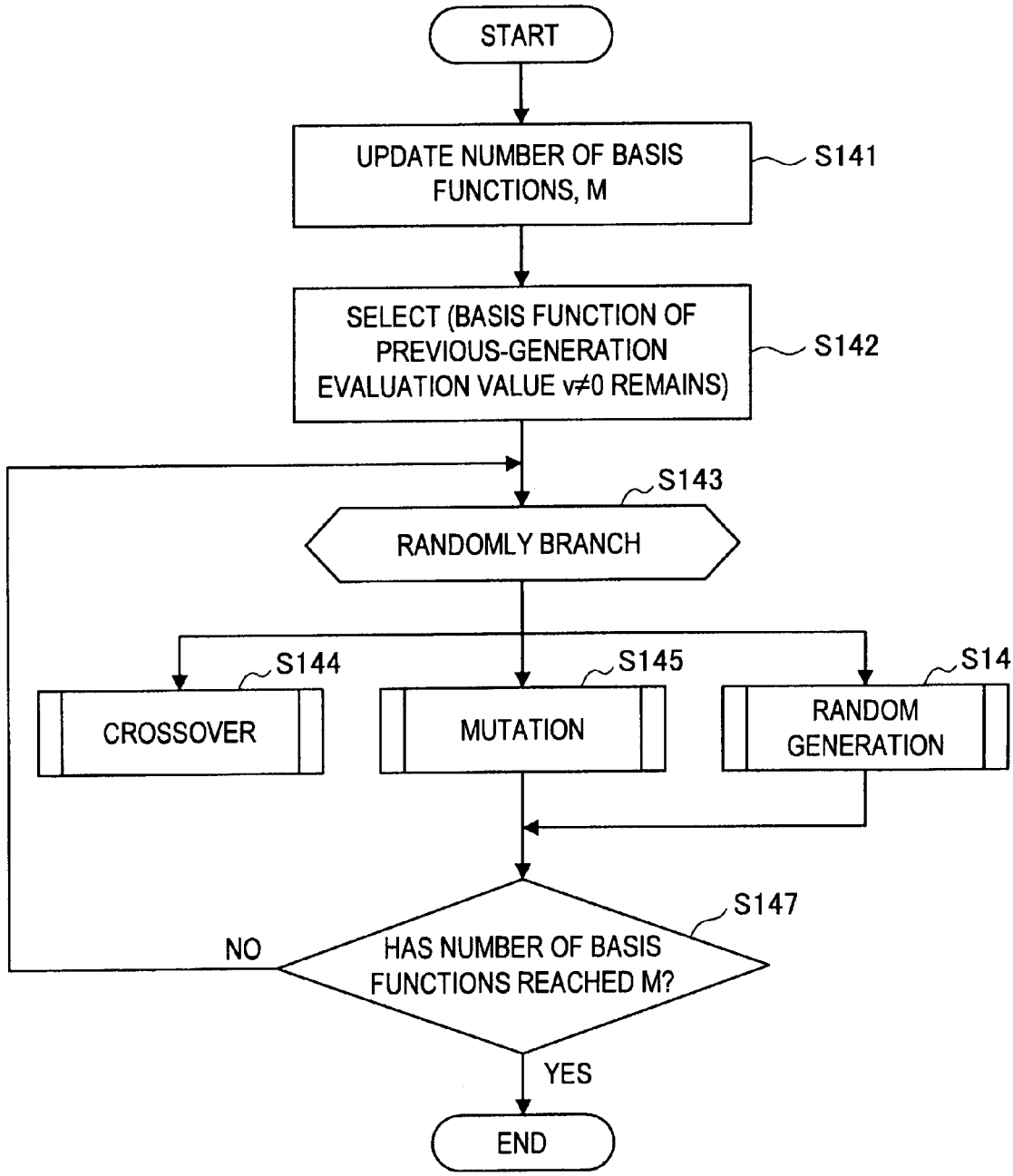
FIG. 10 is an illustrative diagram illustrating a flow of processing in the learning algorithm according to the same embodiment (evolutionary generation of a basis function)

First, FIG. 10 will be referred to. As shown in FIG. 10, the information processing device 100 updates the number of basis functions, M (S141). That is, the information processing device 100 decides the number of τ-th-generation basis functions, $M_\tau$. Next, the information processing device 100 selects e useful basis functions from among (τ−1)-th-generation basis functions on the basis of an evaluation value $v_{\tau-1} = \{v_{1,\tau-1}, \ldots, v_{M,\tau-1}\}$ for the τ-th-generation basis functions $\phi_{m,\tau-1}$ (m=1 to M), and sets the selected basis functions to τ-th-generation basis functions $\phi_{1,\tau}, \ldots, \phi_{e,\tau}$ (S142).

Next, the information processing device 100 randomly selects a method of generating ($M_\tau$−e) remaining basis functions $\phi_{e+1,\tau}, \ldots, \phi_{M\tau,\tau}$ from among crossover, mutation, and random generation (S143). If the crossover has been selected, the information processing device 100 moves the processing to step S144. If the mutation has been selected, the information processing device 100 moves the processing to step S145. If the random generation has been selected, the information processing device 100 moves the processing to step S146.

If the processing moves to step S144, the information processing device 100 generates a new basis function $\phi_{m',\tau}$ (m'≥e+1) by crossing basis functions selected from among the basis functions $\phi_{1,\tau}, \ldots, \phi_{e,\tau}$ selected in step S142 (S144). If the processing moves to step S145, the information processing device 100 generates a new basis function $\phi_{m',\tau}$ (m'≥e+1) by mutating basis functions selected from among the basis functions $\phi_{1,\tau}, \ldots, \phi_{e,\tau}$ selected in step S142 (S145). On the other hand, if the processing moves to step S146, the information processing device 100 randomly generates a new basis function $\phi_{m',\tau}$ (m'≥e+1) (S146).

When the processing of any one of steps S144, S145, and S146 ends, the information processing device 100 moves the processing to step S147. When the processing moves to step S147, the information processing device 100 determines whether or not the number of τ-th-generation basis functions has reached M (M=$M_\tau$) (S147). If the number of τ-th-generation basis functions has not reached M, the information processing device 100 returns the processing to step S143. On the other hand, if the number of τ-th-generation basis functions has reached M, the information processing device 100 terminates the processing of step S113.

(Details of S144: Crossover)

Here, the processing of step S144 will be described in further detail with reference to FIG. 11.

Figure 11:
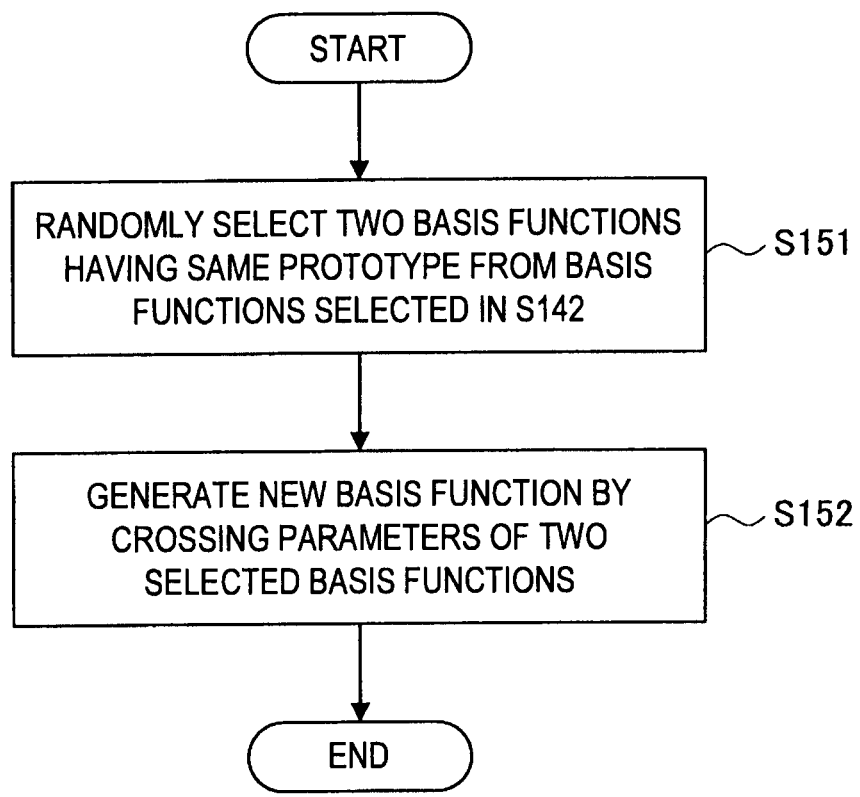
FIG. 11 is an illustrative diagram illustrating a flow of processing in the learning algorithm according to the same embodiment (crossover)

If the processing of step S144 is started, the information processing device 100 randomly selects two basis functions having the same prototype from among basis functions $\phi_{1,\tau}, \ldots, \phi_{e,\tau}$ selected in step S142 as shown in FIG. 11 (S151). Next, the information processing device 100 generates a new basis function by crossing parameters of the two selected basis functions (S152).

(Details of S145: Mutation)

Next, the processing of step S145 will be described in further detail with reference to FIG. 12.

Figure 12:
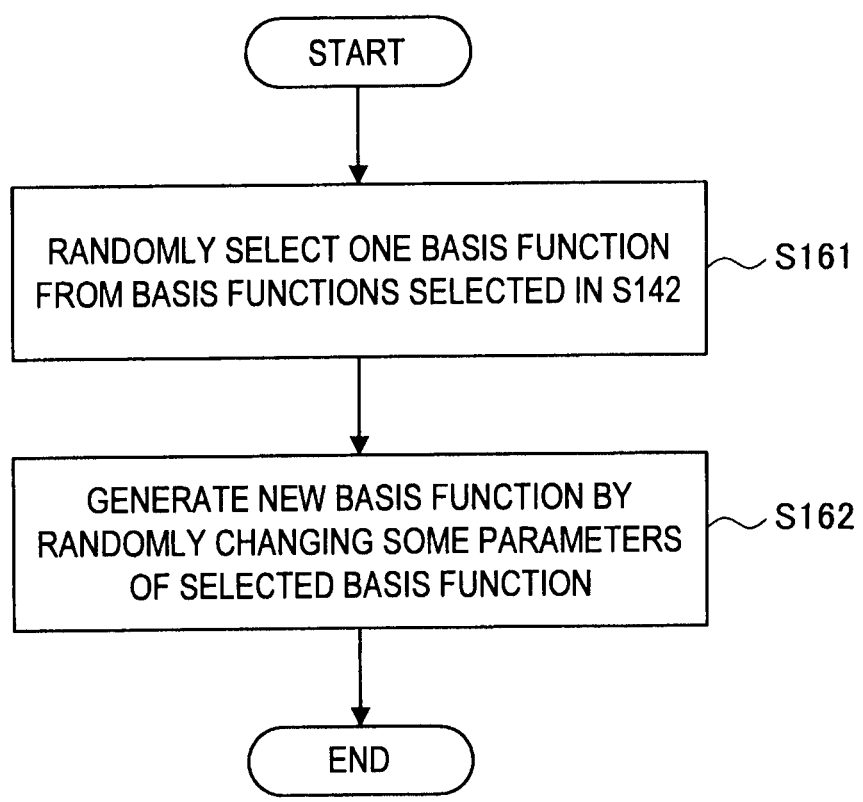
FIG. 12 is an illustrative diagram illustrating a flow of processing in the learning algorithm according to the same embodiment (mutation)

If the processing of step S145 is started, the information processing device 100 randomly selects one basis function from among the basis functions $\phi_{1,\tau}, \ldots, \phi_{e,\tau}$ selected in step S142 as shown in FIG. 12 (S161). Next, the information processing device 100 generates a new basis function by randomly changing some parameters of the selected basis function (S162).

(Details of S146: Random Generation)

Next, the processing of step S146 will be described in further detail with reference to FIG. 9.

If the processing of step S122 is started, the information processing device 100 randomly decides a prototype of the basis function as shown in FIG. 9 (S131). As the prototypes of the basis function, for example, any one of a linear term, a Gaussian kernel, a sigmoid kernel, and a trigonometric function, which are functions having an input of a vector and an output of a scalar, can be used. Next, the information processing device 100 randomly decides a parameter of a decided prototype and generates a basis function (S132).

The processing of step S102 (basis function generation) has been described above in further detail.

(2-2-3: Basis Function Calculation (S103))

Next, the processing of step S103 (basis function calculation) will be described in further detail with reference to FIG. 13.

Figure 13:
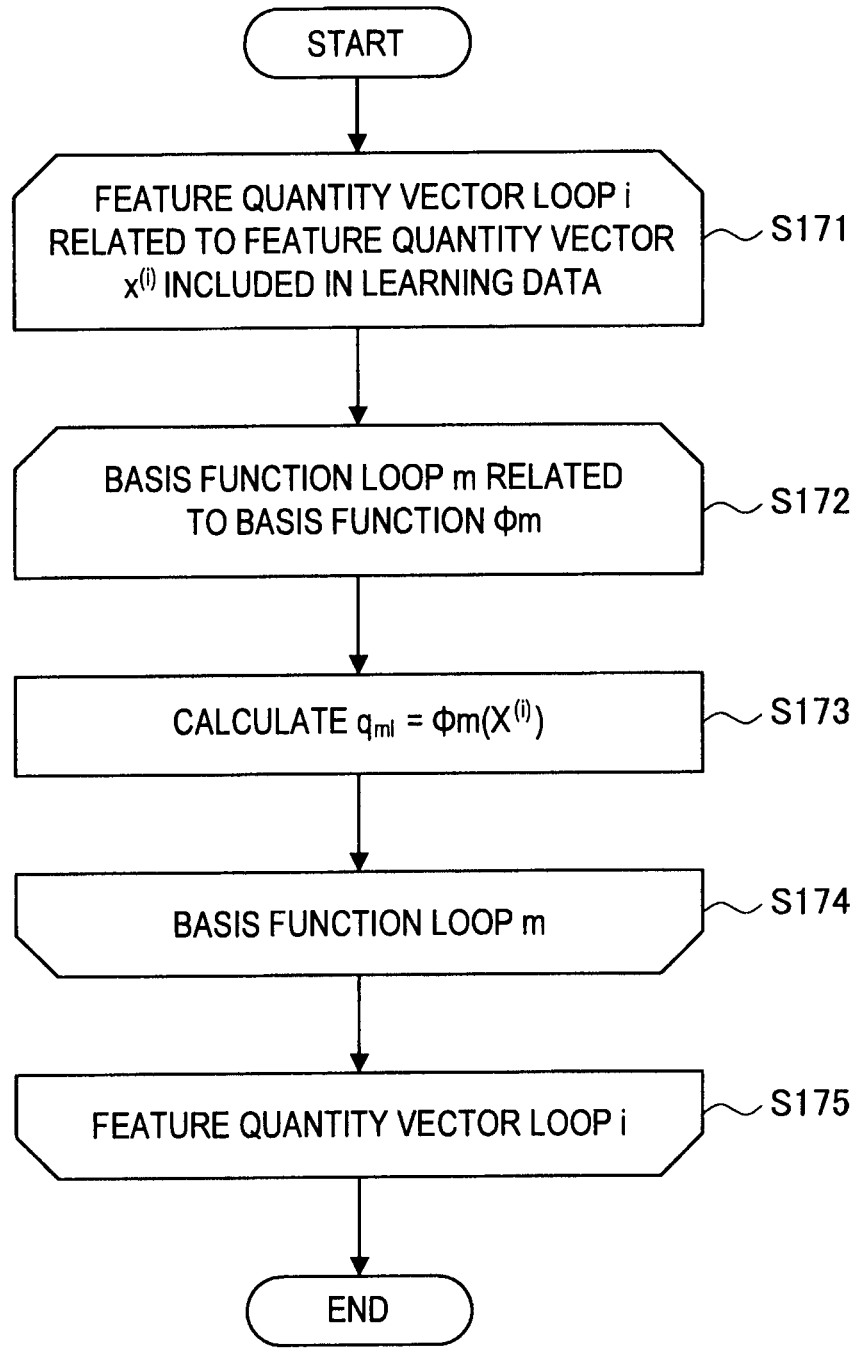
FIG. 13 is an illustrative diagram illustrating a flow of processing in the learning algorithm according to the same embodiment (calculation of a basis function)

As shown in FIG. 13, the information processing device 100 starts a processing loop for an index i of a feature quantity vector $x^{(i)}$ included in learning data (S171). For example, if a set of N feature quantity vectors $\{x^{(1)}, \ldots, x^{(N)}\}$ is input as learning data, the processing loop for i=1 to N is executed. Next, the information processing device 100 starts the processing loop for an index m of a basis function $\phi_m$ (S172). For example, if M basis functions have been generated, the processing loop for m=1 to M is executed.

Next, the information processing device 100 calculates an evaluation value $q_{mi} = \phi_m(x^{(i)})$ (S173). Next, the information processing device 100 moves the processing to step S174, and continues the processing loop for the index m of the basis function. If the processing loop for the index m of the basis function is terminated, the information processing device 100 moves the processing to step S175, and continues the processing loop for the index i of the feature quantity vector. If the processing loop for the index i of the feature quantity vector is terminated, the information processing device 100 terminates the processing of step S103.

The processing of step S103 (basis function calculation) has been described above in further detail.

(2-2-4: Basis Function Evaluation/Estimation Function Generation (S104))

Next, the processing of step S104 (basis function evaluation/estimation function generation) will be described in further detail with reference to FIG. 14.

Figure 14:
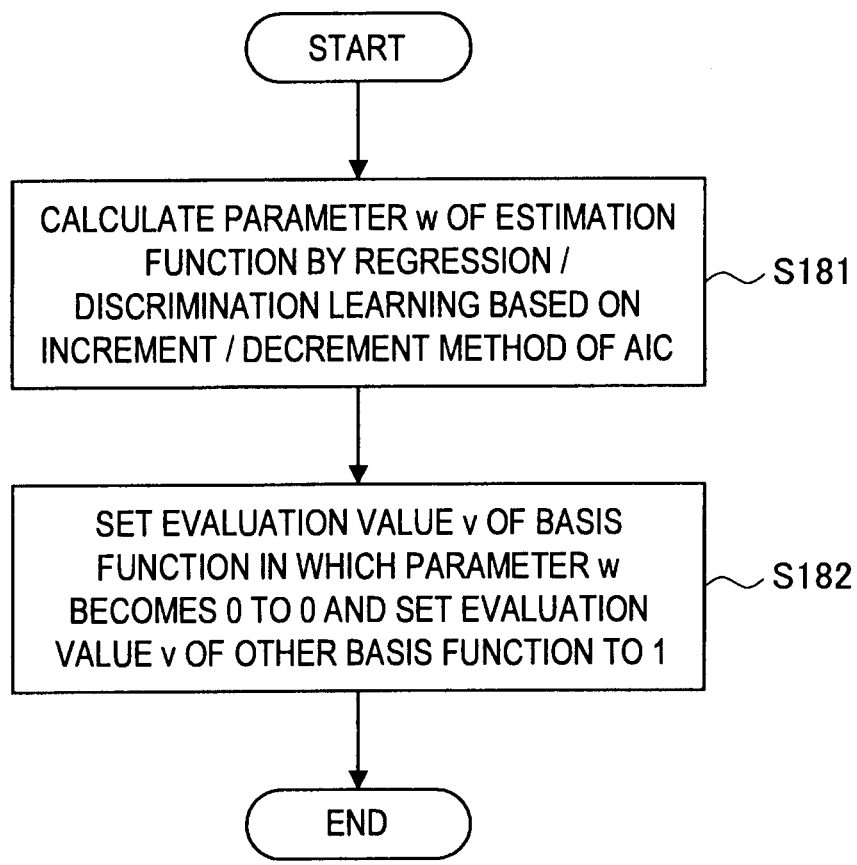
FIG. 14 is an illustrative diagram illustrating a flow of processing in the learning algorithm according to the same embodiment (basis function evaluation/estimation function generation)

As shown in FIG. 14, the information processing device 100 calculates a parameter $w=\{w_0, \ldots, w_m\}$ of an estimation function by regression/discrimination learning based on a stepwise method of AIC (S181). That is, the information processing device 100 obtains a vector $w=\{w_0, \ldots, w_m\}$ by regression/discrimination learning so that a set of a calculation value $q_{mi}=\phi_{m,\tau}(x^{(i)})$ and an objective variable $t^{(i)}$ (i=1 to N) is fitted by the estimation function f. In this regard, the estimation function f(x) is $f(x)=\tau w_m \phi_{m,\tau}(x)+w_0$. Next, the information processing device 100 sets an evaluation value v of the basis function in which the parameter w becomes 0 to 0, and sets another evaluation value v of the basis function to 1 (S182). That is, the basis function of the evaluation value v is a useful basis function.

The processing of step S104 (basis function evaluation/estimation function generation) has been described above in further detail.

The flow of processing related to a learning algorithm of this embodiment is the same as described above. As described above, the processing of steps S102 to S104 is iteratively executed and the basis function is sequentially updated by the evolutionary technique, so that an estimation function is obtained with high estimation accuracy. In particular, because a type of basis function prototype is not limited, high fitting accuracy is obtained even when non-linear data is regressed/discriminated. Further, a load applied to an estimation function calculation can be reduced because only a useful dimension of a feature quantity vector is selectively used.

3. Second Embodiment

Next, the second embodiment of the present disclosure will be described. In the above-described first embodiment, a useful basis function is selected on the basis of regression/discrimination learning using an information quantity criterion. However, a method using ensemble learning is also considered a basis function evaluation method or an objective variable estimation method. In this embodiment, the basis function evaluation method or the objective variable estimation method using the ensemble learning will be described. As a specific technique of the ensemble learning, for example, a technique such as AdaBoost can be applied.

[3-1: Functional Configuration of Information Processing Device 100 (Learning Device)]

First, the functional configuration of the information processing device 100 (the learning device) according to this embodiment will be described with reference to FIG. 15. FIG. 15 is an illustrative diagram illustrating the functional configuration of the information processing device 100 (the learning device) according to the second embodiment of the present disclosure. Constituent elements substantially identical to those of the information processing device 100 according to the above-described first embodiment are denoted by the same reference numerals, and therefore detailed description thereof is omitted.

Figure 15:
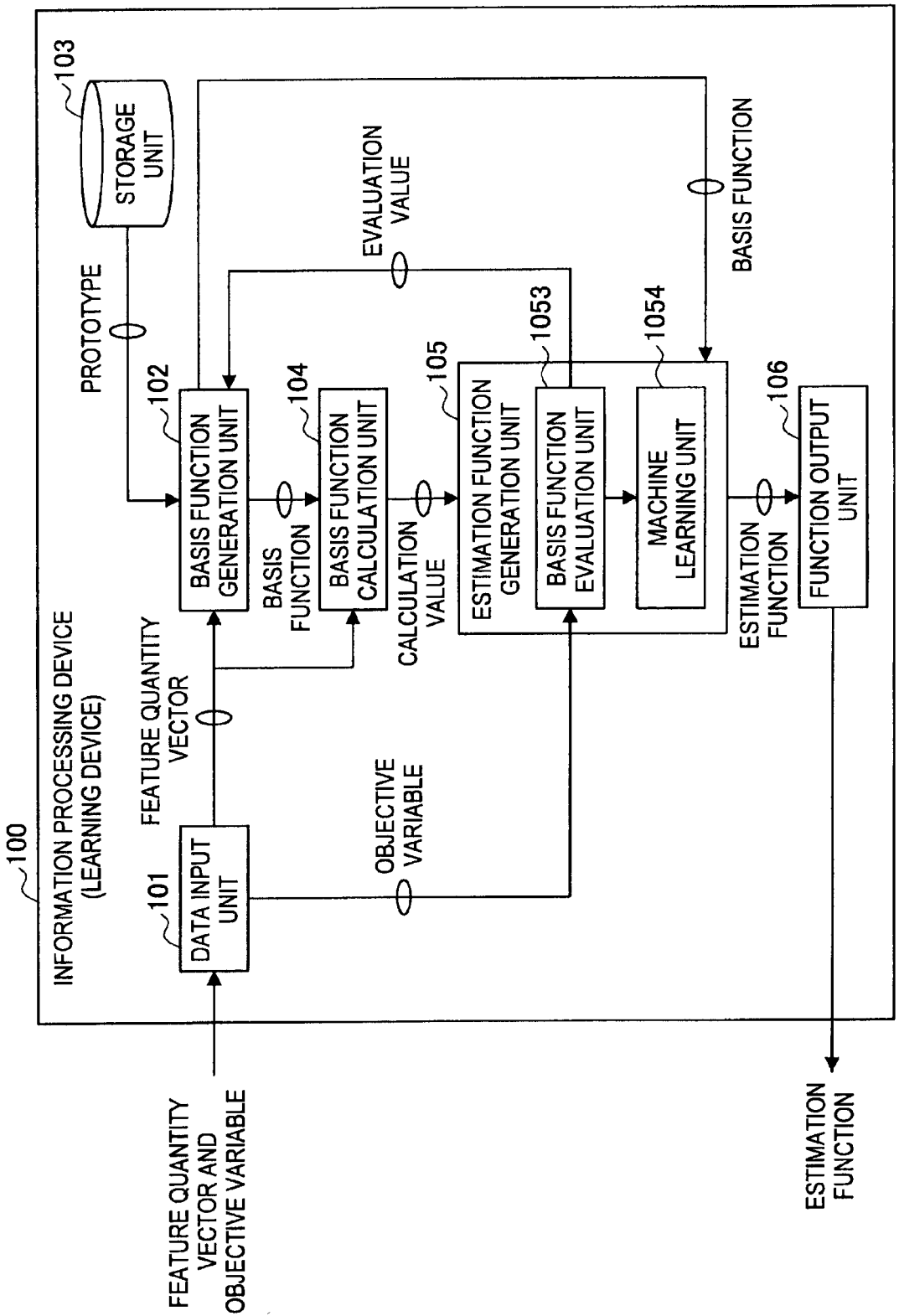
FIG. 15 is an illustrative diagram illustrating a functional configuration of an information processing device (learning device) according to a second embodiment of the present disclosure.

As shown in FIG. 15, the information processing device 100 mainly includes a data input unit 101, a basis function generation unit 102, a storage unit 103, a basis function calculation unit 104, an estimation function generation unit 105, and a function output unit 106. The estimation function generation unit 105 includes a basis function evaluation unit 1053 and a machine learning unit 1054. A major difference from the information processing device 100 according to the above-described first embodiment is the function of the estimation function generation unit 105. Hereinafter, the function of the estimation function generation unit 105 will be described in further detail.

If basis functions $\phi_1$ to $\phi_M$ are input, the estimation function generation unit 105 evaluates the input basis functions $\phi_1$ to $\phi_M$ by the function of the basis function evaluation unit 1053. The basis function evaluation unit 1053 obtains a function $u_m(\phi_m(x))$ in which err shown in the following Equation (9) is minimized. That is, the basis function evaluation unit 1053 obtains parameters d and Th in which err is minimized. In this regard, the following Equation (9) expresses a calculation of weighting values of $u_m(\phi_m(x^{(n)}))$ different from $t_n$ by $g_n$ and adding the weighted values. The function $u_m(\phi_m(x))$ is defined by the following Equation (10). Here, d is 0 or 1. Weight coefficients $g_1$ to $g_N$ are pre-initialized to 1/N.

$$err = \sum_n g_n(u_m(\phi_m(x^{(n)})) \neq t_n) \qquad (9)$$

$$u_m(\phi_m(x^{(n)})) = \begin{cases} d & (\phi_m(x^{(n)}) \geq Th) \\ 1-d & (\phi_m(x^{(n)}) < Th) \end{cases} \qquad (10)$$

After the function $u_m(\phi_m(x))$ is obtained, the basis function evaluation unit 1053 extracts a predetermined number of basis functions $\phi_m(x)$ (for example, 20%) in ascending order of err value, and sets an evaluation value $v_m$ of the extracted basis function $\phi_m(x)$ to 1. The basis function evaluation unit 1053 sets an evaluation value $v_{m'}$ of a basis function $\phi_m(x)$ other than the extracted basis function $\phi_m(x)$ to 0.

As described above, an estimation value $v=\{v_1, \ldots, v_M\}$ set by the basis function evaluation unit 1053 is input to the basis function generation unit 102. If the evaluation value v is input to the basis function generation unit 102, a next-generation basis function is generated by the basis function generation unit 102, a basis function is calculated by the basis function calculation unit 104, and an evaluation value v for the next-generation basis function is set by the basis function evaluation unit 1053. The processing by the basis function generation unit 102, the basis function calculation unit 104, and the basis function evaluation unit 1053 is iteratively executed until a predetermined termination condition is satisfied. The predetermined termination conditions include, for example, when iterative processing has been completed a predetermined number of times, when a minimum value of err has not been updated a predetermined number of times, and the like.

If the predetermined termination condition has been satisfied, the estimation function generation unit 105 adds a basis function $\phi_m(x)$ in which error is minimized to an estimation function f(x) by the function of the machine learning unit 1054. In this regard, the processing of adding the basis function $\phi_m(x)$ to the estimation function f(x) is performed as follows.

First, the machine learning unit 1054 decides a weight coefficient update amount A by the following Equation (11). Next, the machine learning unit 1054 updates a weight coefficient $g_n$ (n=1 to N) on the basis of the following Equation (12). Then, the machine learning unit 1054 normalizes weight coefficients $g_1$ to $g_N$ so that a sum of weight coefficients $g_1$ to $g_N$ becomes 1. Next, the machine learning unit 1054 adds a function $u_m(\phi_m(x))$ based on the basis function $\phi_m(x)$ in which error is minimized to the estimation function f(x). If a finally obtained estimation function is $f(x)=\tau w_k u_k(\phi_k(x))$, $w_k=A$ and $u_m(\phi_m(x))$ in which $u_k(\phi_k(x))=$err is minimized are set.

$$A = \ln\left(\frac{1-err}{err}\right) \quad (11)$$

$$g'_n = \begin{cases} g_n \exp\left(\frac{a}{2}\right) & (\phi_m(x^{(n)}) \neq t_n) \\ g_n \exp\left(-\frac{a}{2}\right) & (\phi_m(x^{(n)}) = t_n) \end{cases} \quad (12)$$

After the update, the weight coefficients $g_1$ to $g_N$ are input to the basis function evaluation unit 1053, and iterative processing is re-executed by the basis function generation unit 102, the basis function calculation unit 104, and the basis function evaluation unit 1053. If a predetermined termination condition related to the iterative processing is satisfied, the basis function $\phi_m(x)$ in which err is minimized is re-added to the estimation function f(x) by the machine learning unit 1054. As described above, the basis function $\phi_m(x)$ in which err is minimized is sequentially calculated and added to the estimation function f(x). As a result, the estimation function $f(x)=\Sigma w_k u_k(\phi_k(x))$ is ultimately obtained. An estimation equation becomes the following Equation (13). This estimation equation indicates that 1 is output if f(x) is greater than 0.5 and that 0 is output if f(x) is equal to or less than 0.5.

$$f(x) = \sum_k w_k u_k(\phi_k(x)) > 0.5 \quad (13)$$

The functional configuration of the information processing device 100 according to this embodiment has been described above.

[3-2: Flow of Learning Processing]

Next, a flow of processing related to the learning algorithm of this embodiment will be described.

(3-2-1: Entire Configuration)

Figure 16:
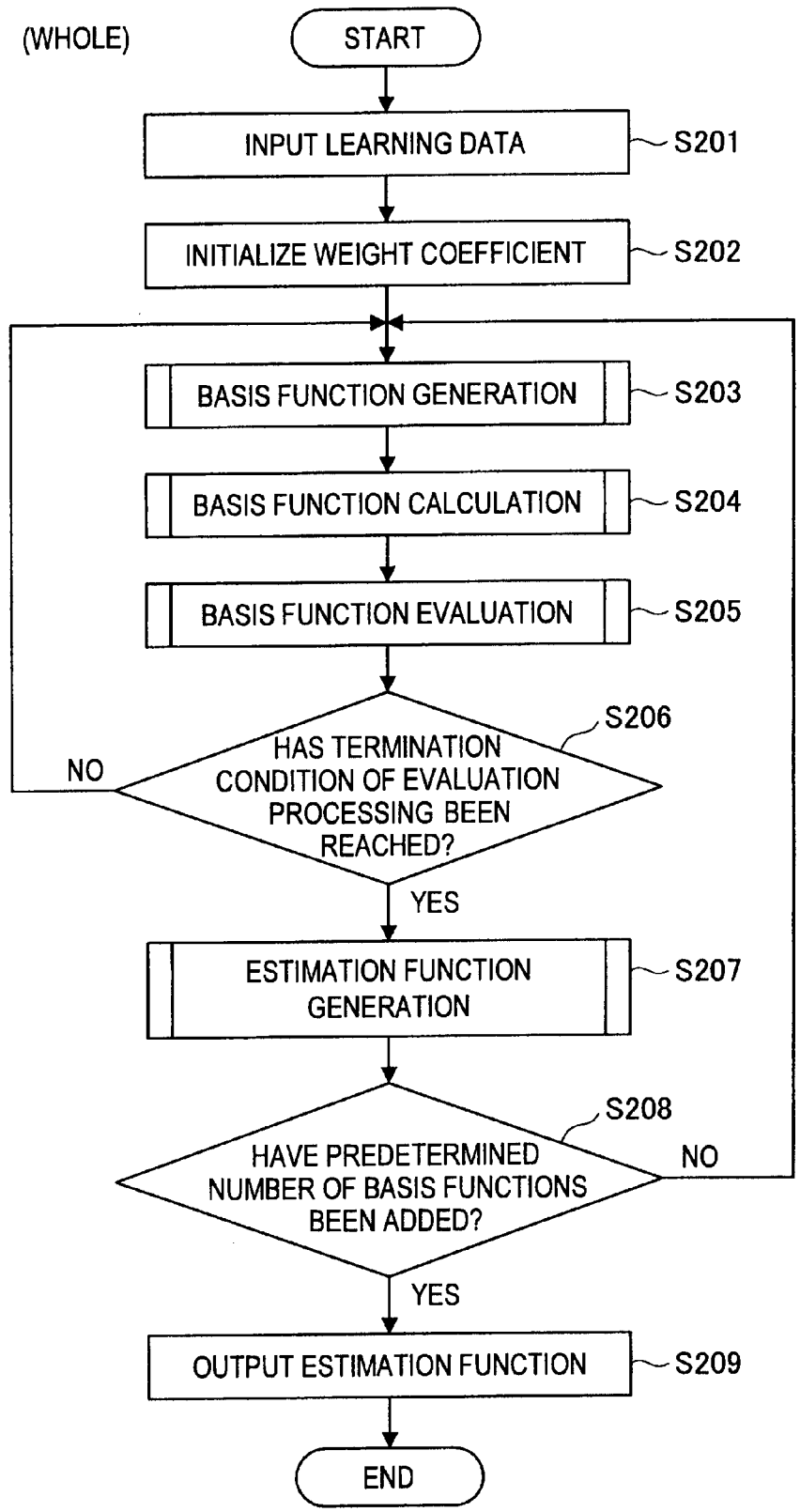
FIG. 16 is an illustrative diagram illustrating a flow of processing in the learning algorithm according to the same embodiment (the whole)

First, the entire processing flow related to the learning algorithm of this embodiment will be described with reference to FIG. 16. FIG. 16 is an illustrative diagram illustrating the entire processing flow in the learning algorithm of this embodiment. The processing related to the learning algorithm of this embodiment is executed by the above-described information processing device 100.

As shown in FIG. 16, first, learning data is input to the information processing device 100 (S201). As the learning data, a set of a feature quantity vector x and an objective variable t as shown in FIG. 2 is input. Next, the information processing device 100 initializes weight coefficients $g_1$ to $g_N$ (S202). Then, the information processing device 100 generates a basis function by the function of the basis function generation unit 102 (S203). The processing of step S203 is substantially the same as the processing of step S102 shown in FIG. 6.

Next, the information processing device 100 calculates a basis function by the function of the basis function calculation unit 104 (S204). That is, the information processing device 100 calculates a calculation value of the basis function by inputting the feature quantity vector x to the basis function generated in step S102. The processing of step S204 is substantially the same as the processing of step S103 shown in FIG. 6. Next, the information processing device 100 evaluates the basis function by the function of the estimation function generation unit 105 (S205). Next, the information processing device 100 determines whether or not a termination condition of iterative processing related to the basis function evaluation has been reached (S206).

If the termination condition of the iterative processing has been reached, the information processing device 100 moves the processing to step S207. On the other hand, if the termination condition of the iterative processing has not been reached, the information processing device 100 returns the processing to step S203, and re-executes the processing of steps S203 to S205. If the processing moves to step S207, the information processing device 100 generates an estimation function on the basis of an evaluation result in step S205 (S207). Next, the information processing device 100 determines whether or not a predetermined number of basis functions have been added to the estimation function (S208).

If a predetermined number of basis functions have been added to the estimation function, the information processing device 100 moves the processing to step S209. On the other hand, if a predetermined number of basis functions have not been added to the estimation function, the information processing device 100 returns the processing to step S203. If the processing moves to step S209, the information processing device 100 outputs the estimation function to which a predetermined number of basis functions are added (S209), and terminates a series of processing.

(3-2-2: Evaluation of Basis Function (S206))

Here, the processing of step S206 (basis function evaluation) will be described in further detail with reference to FIG. 17.

Figure 17:
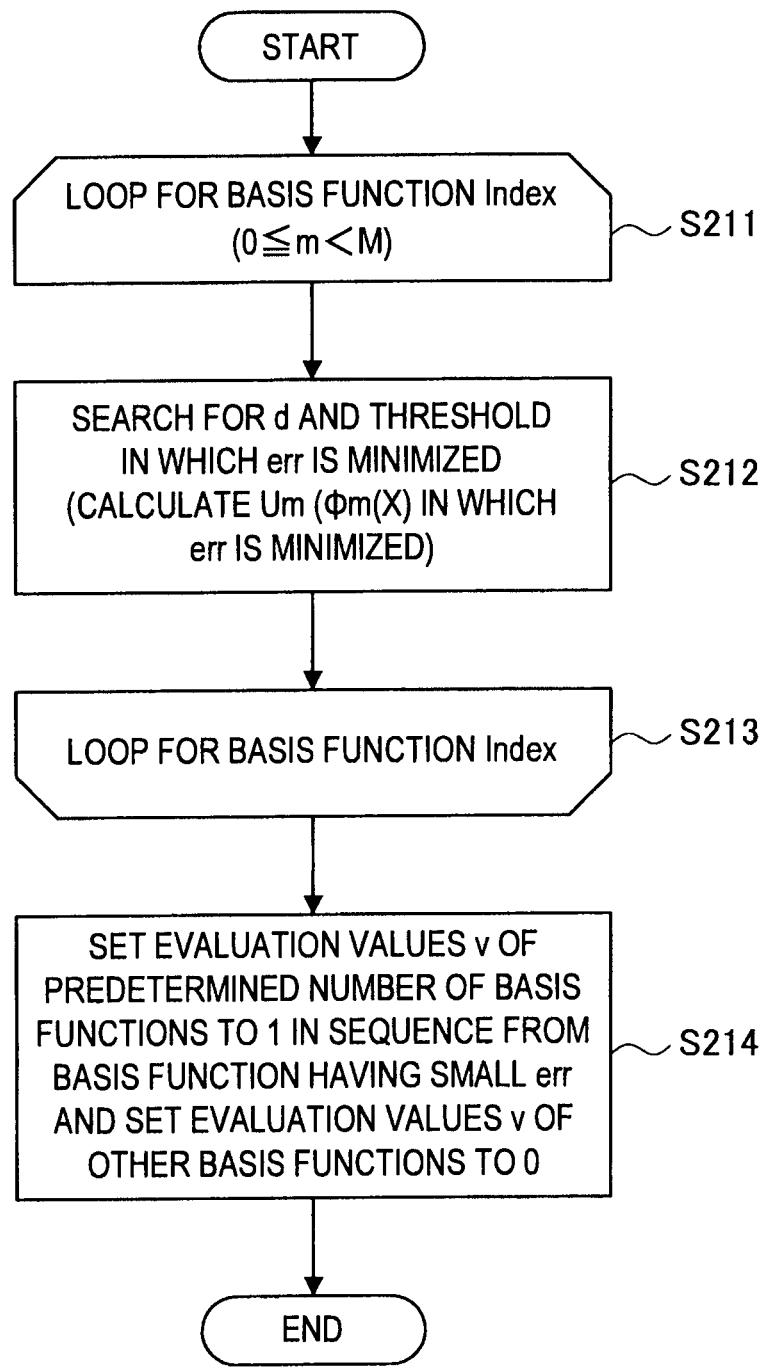
FIG. 17 is an illustrative diagram illustrating a flow of processing in the learning algorithm according to the same embodiment (evaluation of a basis function)

If the processing of step S206 is started, the information processing device 100 starts a processing loop for a basis function index m (m=0 to M−1) as shown in FIG. 17 (S211). The information processing device 100 calculates parameters d and Th so that err defined by the above-described Equation (9) is minimized (S212). That is, the information processing device 100 calculates $u_m(\phi_m(x))$ in which err is minimized. Next, the information processing device 100 moves the processing to step S214 if the basis function index m=M−1, and re-executes the processing of step S212 by incrementing m if m<M−1 (S213).

If the processing moves to step S214, the information processing device 100 sets evaluation values v of a predetermined number of basis functions to 1 in order from a basis function in which err is minimized, and sets evaluation values v of the other basis functions to 0 (S214). If the evaluation values v are completely set, the information processing device 100 terminates the processing of step S206.

(3-2-3: Generation of Estimation Function (S207))

Next, the processing of step S207 (estimation function generation) will be described in further detail with reference to FIG. 18.

Figure 18:
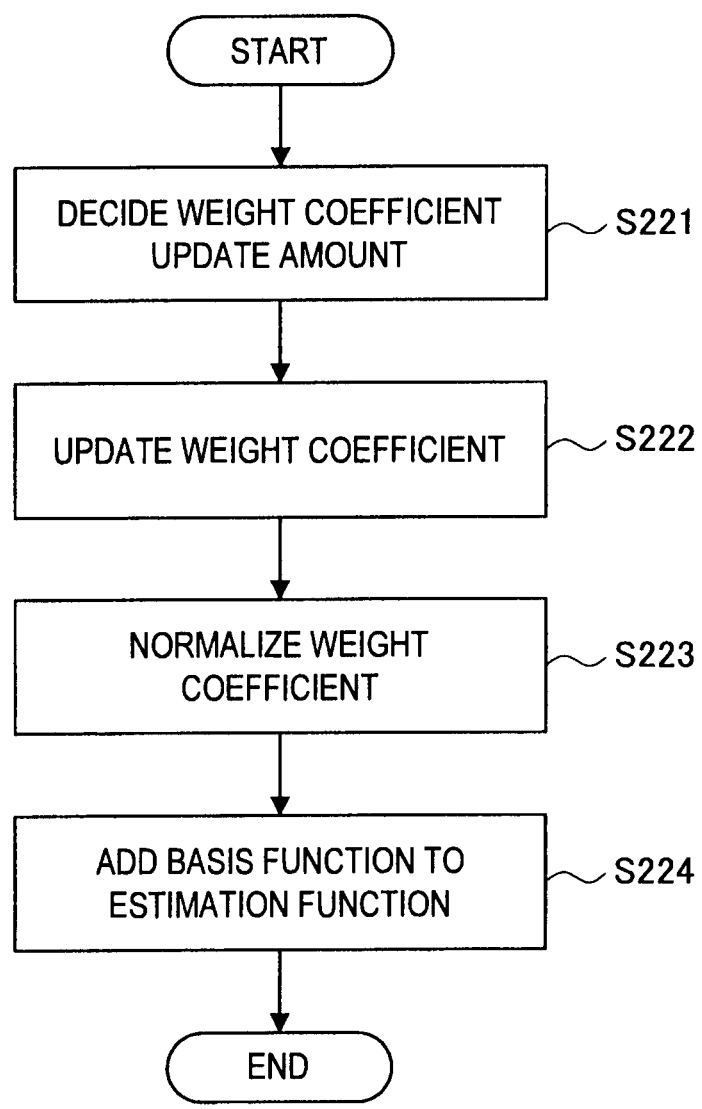
FIG. 18 is an illustrative diagram illustrating a flow of processing in the learning algorithm according to the same embodiment (generation of an estimation function)

If the processing of step S207 is started, the information processing device 100 decides update amounts A of weight coefficients $g_1$ to $g_N$ as shown in FIG. 18 (S221). Next, the information processing device 100 updates the weight coefficients $g_1$ to $g_N$ on the basis of the update amounts A decided in step S221 (S222). Then, the information processing device 100 normalizes the weight coefficients $g_1$ to $g_N$ so that a sum of the weight coefficients $g_1$ to $g_N$ becomes 1 (S223). Next, the information processing device 100 adds the basis function to the estimation function (S224). If the basis function is added to the estimation function, the information processing device 100 terminates the processing of step S207.

The flow of processing related to the learning algorithm of this embodiment has been described above.

4. Hardware Configuration

Figure 19:
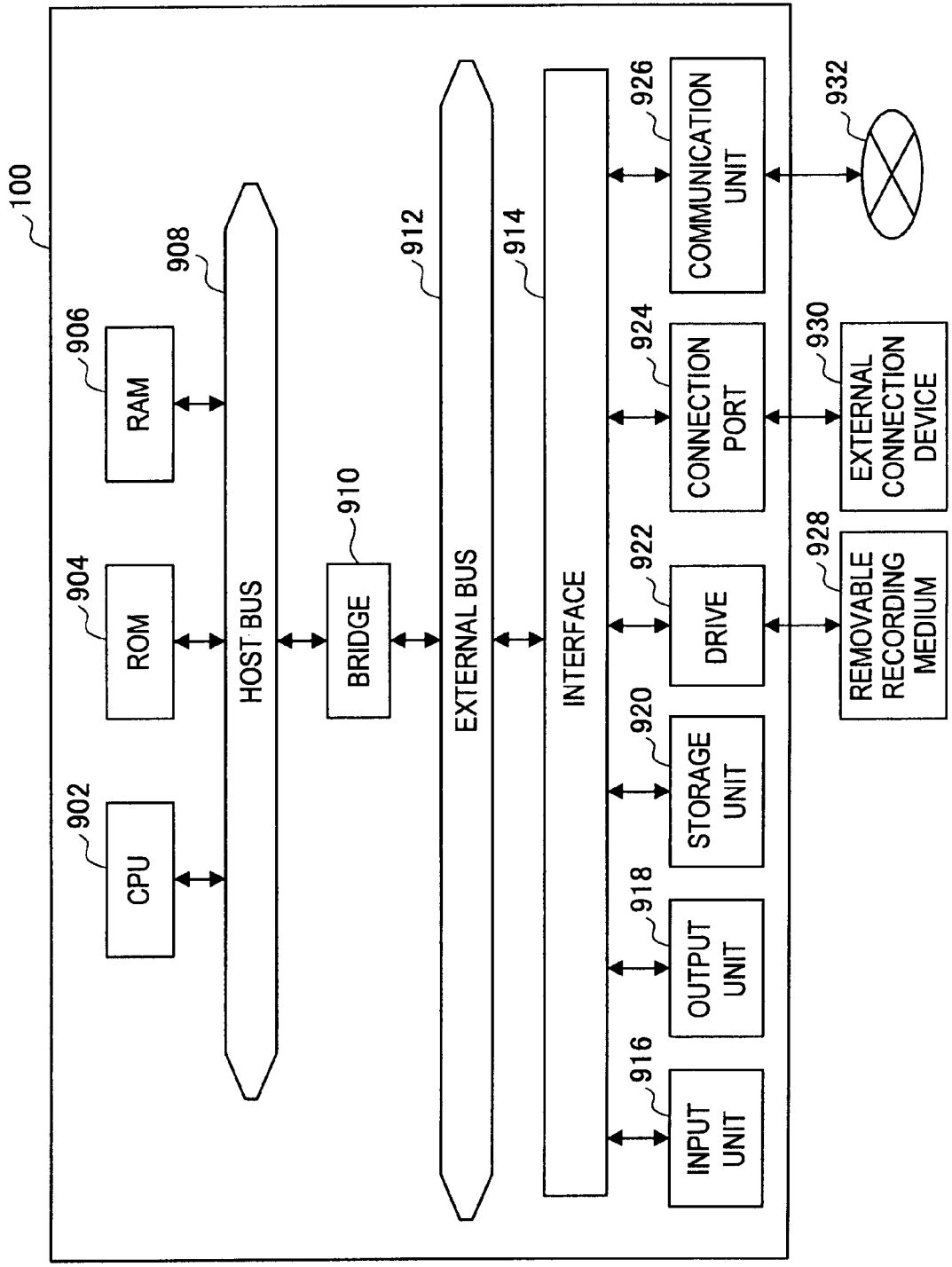
FIG. 19 is an illustrative diagram illustrating a hardware configuration capable of implementing a function of the information processing device (learning device) according to each embodiment of the present disclosure.

The function of each structural element of the information processing device 100 described above can be realized by using, for example, the hardware configuration shown in FIG. 19. That is, the function of each structural element can be realized by controlling the hardware shown in FIG. 19 using a computer program. Additionally, the mode of this hardware is arbitrary, and may be a personal computer, a mobile information terminal such as a mobile phone, a PHS or a PDA, a game machine, or various types of information appliances. Moreover, the PHS is an abbreviation for Personal Handyphone System. Also, the PDA is an abbreviation for Personal Digital Assistant.

As shown in FIG. 19, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removal recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removal recording medium 928 such as a magnetic disk, an optical disk, a magneto-optical disk, or a semiconductor memory, or writes information in the removal recording medium 928. The removal recording medium 928 is, for example, a DVD medium, a Blu-ray medium, an HD-DVD medium, various types of semiconductor storage media, or the like. Of course, the removal recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or various communication modems. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

5: Summary

Finally, technical content according to the embodiment of the present disclosure will be briefly summarized. Here, the described technical content can be applied to various information processing devices, for example, such as a PC, a mobile phone, a mobile game machine, a mobile information terminal, an information appliance, and a car navigation system.

The functional configuration of the information processing device described above can be expressed as follows. The information processing device has an input unit, a basis function generation unit, a scalar quantity calculation unit, a basis function evaluation unit, an estimation function generation unit, and an output unit as follows. The above-described input unit is means for inputting a feature quantity vector and an objective variable corresponding to the feature quantity vector. The above-described basis function generation unit is means for generating a basis function for outputting a scalar quantity by mapping the feature quantity vector. The above-described scalar quantity calculation unit is means for mapping the feature quantity vector using the basis function generated by the basis function generation unit and calculating a scalar quantity corresponding to the feature quantity vector.

The above-described basis function evaluation unit is means for evaluating whether or not a basis function used to calculate a scalar quantity is useful for estimating an objective variable using the objective variable input by the input unit along with a scalar quantity calculated by the scalar quantity calculation unit and a feature quantity vector corresponding to the scalar quantity. Further, the above-described estimation function generation unit is means for generating an estimation function for estimating an objective variable from a scalar quantity by machine learning on the basis of the scalar quantity calculated by the scalar quantity calculation unit and the objective variable corresponding to the scalar quantity using a basis function evaluated to be useful by the basis function evaluation unit. The above-described output unit is means for outputting the estimation function generated by the estimation function generation unit.

As described above, an estimation function is generated using a useful basis function among basis functions generated by combining predetermined functions, so that it is possible to obtain a sparse estimation function while maintaining sufficient estimation accuracy. As a result, it is possible to reduce a memory amount and a calculation amount necessary to obtain the estimation accuracy having the same level as that of the estimation function obtained by the technique of the related art, using the above-described estimation function.

Application Example

The learning algorithm according to this embodiment can be used to automatically construct an estimation algorithm for receiving a feature quantity extracted from music and estimating a musical mood (bright, dark, calm, spirited, or the like) and a genre (rock, pop, jazz, classical, or the like), a type of musical instrument used (voice, guitar, base, drum, piano, or the like), and the like. The learning algorithm according to this embodiment can be used to automatically construct a recognition algorithm for receiving a feature quantity extracted from a photo, and recognizing what is mapped to the photo (physical body recognition) or recognizing a scene (street, sea, mountain, or the like) mapped to the photo.

In addition, the learning algorithm according to this embodiment can be used to automatically construct an estimation algorithm for receiving a feature quantity extracted from a motion sensor signal obtained by a triaxial acceleration sensor, a triaxial gyro sensor, or the like and automatically estimating the behavior of a user carrying a device equipped with a motion sensor. Further, the learning algorithm according to this embodiment can be used to automatically construct a recognition algorithm for receiving a feature quantity extracted from an image of goods before shipment in a factory or audio input data, and recognizing whether or not goods satisfy a shipment criterion.

The learning algorithm according to this embodiment can be used to automatically construct a recognition algorithm for receiving a medical image (x-ray, CT image, or the like) and recognizing a patient's disease. The learning algorithm according to this embodiment can be used to construct a user interface (brain machine interface (BMI) or the like) for receiving a signal obtained from a human body sensor such as a myoelectric sensor, an electroencephalograph, or the like and recognizing a user's disease or recognizing user-desired manipulation.

REFERENCE

The above-described data input unit 101 is an example of an input unit. The above-described basis function calculation unit 104 is an example of a scalar quantity calculation unit. The above-described function output unit 106 is an example of an output unit. The above-described feature quantity function generation unit 102 is an example of a generation alternation unit.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-159597 filed in the Japan Patent Office on Jul. 14, 2010, and reflected in the translated copy submitted to the U.S. Patent and Trademark Office in connection with this application, the entire content of which is hereby incorporated by reference.

What is claimed is:

1. An information processing device comprising hardware including a microprocessor, the microprocessor comprising:
    an input unit for inputting a feature quantity vector and an objective variable corresponding to the feature quantity vector;
    a basis function generation unit for generating a basis function by randomly selecting a prototype function among a plurality of pre-stored prototype functions and randomly setting parameters of the selected prototype function for outputting a scalar quantity by mapping the feature quantity vector;
    a scalar quantity calculation unit for mapping the feature quantity vector using the basis function generated by the basis function generation unit and calculating the scalar quantity corresponding to the feature quantity vector;
    a basis function evaluation unit for evaluating whether or not the basis function used to calculate the scalar quantity is useful for estimating the objective variable using the objective variable input by the input unit along with the scalar quantity calculated by the scalar quantity calculation unit and the feature quantity vector corresponding to the scalar quantity;
    a generation alternation unit for generating a next-generation basis function by executing at least one operation from the selection of the useful basis function, generation of a new basis function by mutation and crossover using the useful basis function, and random generation of the new basis function on the basis of an evaluation result by the basis function evaluation unit, by utilizing an evolutionary technique, wherein generating further comprises randomly selecting a method of generating second-generation basis functions from among a mutation method, a crossover method, and a random generation method;
    an estimation function generation unit for generating an estimation function for estimating the objective variable from the scalar quantity by machine learning on the basis of the scalar quantity calculated by the scalar quantity calculation unit and the objective variable corresponding to the scalar quantity using the basis function evaluated to be useful by the basis function evaluation unit; and
    an output unit for outputting the estimation function generated by the estimation function generation unit,
    wherein processing of generating the estimation function by the estimation function generation unit, processing of generating the next-generation basis function by the generation alternation unit, processing of calculating the scalar quantity by the scalar quantity calculation unit, and processing of evaluating the basis function by the basis function evaluation unit are iteratively executed.

2. The information processing device according to claim 1, wherein the basis function generation unit generates the basis function for outputting the scalar quantity by mapping only part of the feature quantity vector.

3. The information processing device according to claim 1, wherein the basis function generation unit generates the basis function for outputting the scalar quantity by at least one type of basis selected from the group of a linear-basis, kernel-basis, power-basis, and trigonometric-function-basis.

4. The information processing device according to claim 1, wherein the basis function evaluation unit executes regression or discrimination learning for estimating the objective variable corresponding to the scalar quantity while selecting the scalar quantity according to an information quantity criterion, and evaluates that the basis function used to calculate the scalar quantity selected according to the information quantity criterion is useful.

5. The information processing device according to claim 1, wherein the estimation function generation unit sequentially adds the basis function evaluated to be useful by the basis function evaluation unit to the estimation function.

6. An information processing method comprising:
   inputting a feature quantity vector and an objective variable corresponding to the feature quantity vector;
   generating a basis function by randomly selecting a prototype function among a plurality of pre-stored prototype functions and randomly setting parameters of the selected prototype function for outputting a scalar quantity by mapping the feature quantity vector;
   mapping the feature quantity vector using the basis function and calculating the scalar quantity corresponding to the feature quantity vector;
   evaluating whether or not the basis function used to calculate the scalar quantity is useful for estimating the objective variable using the objective variable along with the scalar quantity and the feature quantity vector corresponding to the scalar quantity;
   generating a next-generation basis function by executing at least one operation from the selection of the useful basis function, generation of a new basis function by mutation, and crossover using the useful basis function, and random generation of the new basis function on the basis of an evaluation result by the basis function evaluation unit, by utilizing an evolutionary technique, wherein generating further comprises randomly selecting a method of generating second-generation basis functions from among a mutation method, a crossover method, and a random generation method;
   generating an estimation function for estimating the objective variable from the scalar quantity by machine learning on the basis of the scalar quantity and the objective variable corresponding to the scalar quantity using the basis function evaluated to be useful; and
   outputting the estimation function,
   wherein processing of generating the estimation function by the estimation function generation unit, processing of generating the next-generation basis function by the generation alternation unit, processing of calculating the scalar quantity by the scalar quantity calculation unit, and processing of evaluating the basis function by the basis function evaluation unit are iteratively executed.

7. A non-transitory, computer-readable medium comprising instructions for causing a computer to execute:
   an input function of inputting a feature quantity vector and an objective variable corresponding to the feature quantity vector;
   a basis function generation function of generating a basis function by randomly selecting a prototype function among a plurality of pre-stored prototype functions and randomly setting parameters of the selected prototype function for outputting a scalar quantity by flapping the feature quantity vector;
   a scalar quantity calculation function of mapping the feature quantity vector using the basis function generated by the basis function generation function and calculating the scalar quantity corresponding to the feature quantity vector;
   a basis function evaluation function of evaluating whether or not the basis function used to calculate the scalar quantity is useful for estimating the objective variable using the objective variable input by the input function along with the scalar quantity calculated by the scalar quantity calculation function and the feature quantity vector corresponding to the scalar quantity;
   a generation alternation unit for generating a next-generation basis function by executing at least one operation from the selection of the useful basis function, generation of a new basis function by mutation and crossover using the useful basis function, and random generation of the new basis function on the basis of an evaluation result by the basis function evaluation unit, by utilizing an evolutionary technique, wherein generating further comprises randomly selecting a method of generating second-generation basis functions from among a mutation method, a crossover method, and a random generation method;
   an estimation function generation function of generating an estimation function for estimating the objective variable from the scalar quantity by machine learning on the basis of the scalar quantity calculated by the scalar quantity calculation function and the objective variable corresponding to the scalar quantity using the basis function evaluated to be useful by the basis function evaluation function; and
   an output function of outputting the estimation function generated by the estimation function generation function,
   wherein processing of generating the estimation function by the estimation function generation unit, processing of generating the next-generation basis function by the generation alternation unit, processing of calculating the scalar quantity by the scalar quantity calculation unit, and processing of evaluating the basis function by the basis function evaluation unit are iteratively executed.

* * * * *